(12) United States Patent  (10) Patent No.: US 6,400,461 B1
Oikawa  (45) Date of Patent: Jun. 4, 2002

(54) IMAGE FORMING METHOD

(75) Inventor: Masami Oikawa, Yokohama (JP)

(73) Assignees: Toshiba Tec Kabushiki Kaisha, Tokyo; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/300,397

(22) Filed: Apr. 27, 1999

(30) Foreign Application Priority Data

May 19, 1998 (JP) .......................................... 10-136241

(51) Int. Cl.[7] .............................................. G06K 15/00
(52) U.S. Cl. ........................ 358/1.1; 358/1.9; 358/1.14
(58) Field of Search ........................ 358/1.1, 1.9, 1.14, 358/401; 399/21, 16

(56) References Cited

U.S. PATENT DOCUMENTS

| 5,418,607 | A | * | 5/1995 | Tani | 355/319 |
| 5,598,271 | A | * | 1/1997 | Ohtani | 358/296 |
| 5,731,879 | A | | 3/1998 | Maniwa et al. | 358/296 |
| 6,018,398 | A | * | 1/2000 | Bunker | 358/1.15 |
| 6,313,919 | B1 | * | 11/2001 | Nakagiri et al. | 358/1.11 |

FOREIGN PATENT DOCUMENTS

| JP | 8-278728 | 10/1996 | .......... G03G/21/00 |
| JP | 9-258516 | 10/1997 | .......... G03G/15/00 |

* cited by examiner

Primary Examiner—Jerome Grant, II
(74) Attorney, Agent, or Firm—Foley & Lardner

(57) ABSTRACT

In a case where the control operation for feeding paper on the front surface of which an image is printed without waiting for completion of the feeding of a document is effected by use of an automatic document feeding device and double face printer, whether or not the image is correctly printed on the front surface of the stacked paper is stored in a stack table when the paper is stacked in the double face printer and the paper on which the image is not correctly printed based on the contents of the status table is discharged when an image is printed on the rear surface of the paper. Thus, the printing result in which the relation between the pages of the front and rear surfaces of the sheets of paper on which plural pages of images are printed by double face printing is the same as in the normal case can be attained and the paper which is not correctly printed can be easily distinguished.

9 Claims, 17 Drawing Sheets

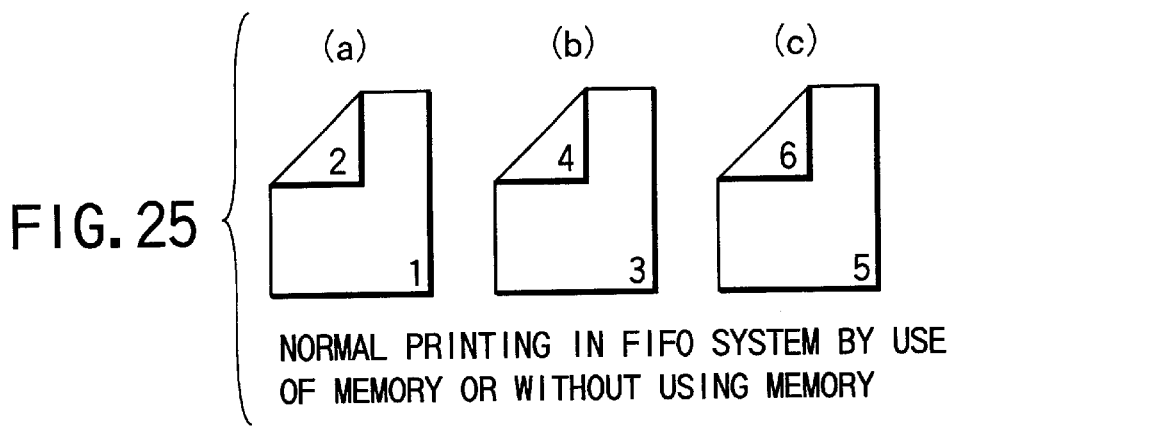
FIG. 25 NORMAL PRINTING IN FIFO SYSTEM BY USE OF MEMORY OR WITHOUT USING MEMORY
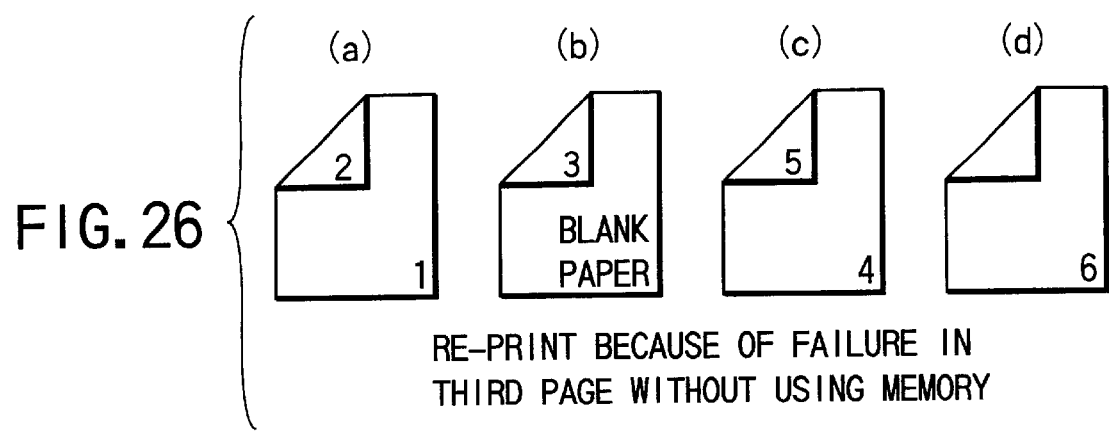
FIG. 26 RE-PRINT BECAUSE OF FAILURE IN THIRD PAGE WITHOUT USING MEMORY
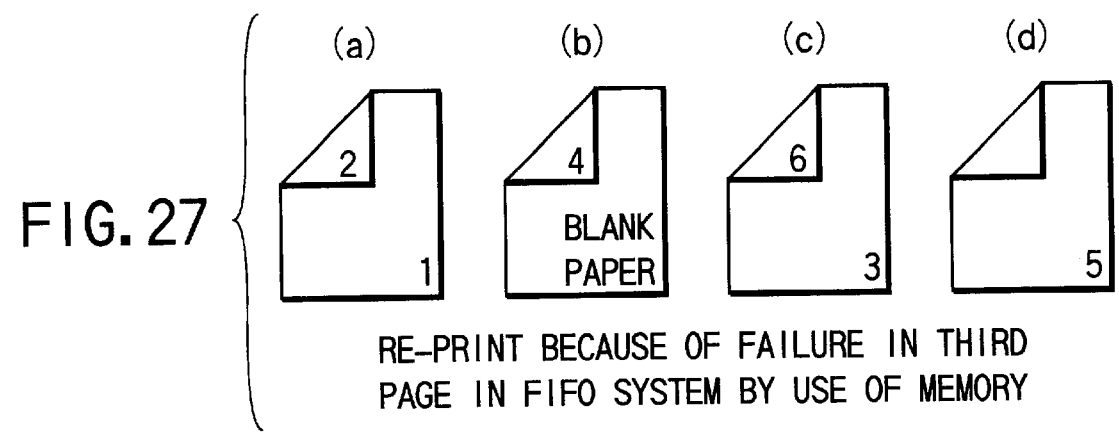
FIG. 27 RE-PRINT BECAUSE OF FAILURE IN THIRD PAGE IN FIFO SYSTEM BY USE OF MEMORY (a) 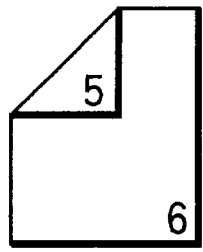 (b) 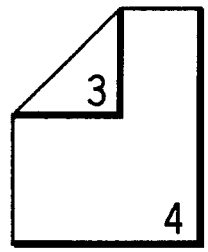 (c) 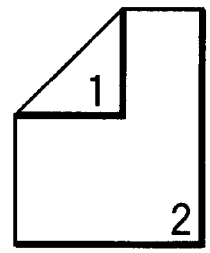
NORMAL PRINTING IN FIFO SYSTEM BY USE OF MEMORY
FIG. 28
(a) 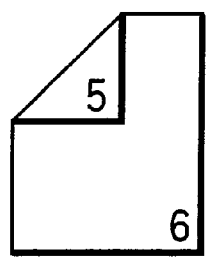 (b) 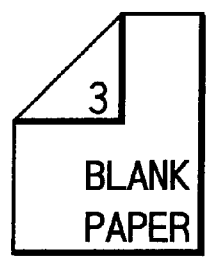 (c) 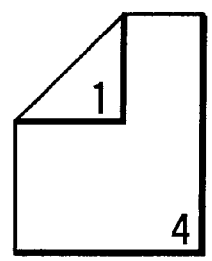 (d) 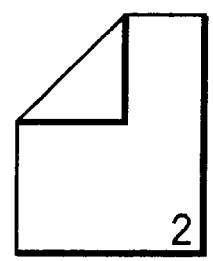
RE-PRINT BECAUSE OF FAILURE IN FOURTH PAGE BY USE OF MEMORY
FIG. 29

IMAGE FORMING METHOD

BACKGROUND OF THE INVENTION

This invention relates to an image forming method for a copying machine using an automatic document feeder and double face printer, for example.

In recent years, in an image forming apparatus, an attempt is made to shorten time for printing paper to reach the printing position and enhance the copying speed by feeding printing paper at the same time as feeding of a document in a case where an automatic document feeder (ADF) is used to effect the continuous copying operation.

In this case, if a document jam occurs during the document feeding process by use of the ADF and normal image reading cannot be attained, printing paper which is already started to be fed is also jammed if it is stopped at the place. Therefore, the printing paper is discharged as a failure in printing in order to prevent the paper jam.

At this time, the document fed is not placed in the normal position. Therefore, if a scanned image is output, there occurs a possibility that an image is only partly printed on the printing paper or an image of the preceding document is printed on the printing paper. In order to prevent the user from being disturbed, the image is not output, only the paper is fed and, as a result, a blank sheet of paper is obtained. Therefore, in the specified discharging destination, one or more blank sheets of paper are discharged.

When double face printing is effected by use of a double face printer (perfecting machine) and if blank printing occurs by a document jam or the like, paper printed in the blank state is stacked (stored) in the double face printer. As the result, since one page of blank paper is inserted, the normal relation between the pages on the front and rear surfaces cannot be obtained.

For example, in a case where one set of documents including single-face documents of six pages are printed on printing paper by double face printing by use of a copying machine having no memory for storing read images, the documents are printed with the first page/second page, third page/fourth page, fifth page/sixth page printed on the front/rear surfaces of respective sheets of printing paper as shown at (a) to (c) in FIG. 25 if the normal printing is effected.

If the document of third page is jammed to cause abnormal paper feeding and a failure in reading of the document occurs, the first page/second page, abnormal image (blank paper)/third page, fourth page/fifth page, sixth page/blank page are obtained on the front/rear surfaces of respective sheets of printing paper as shown at (a) to (d) in FIG. 26. Therefore, in comparison with the printing result of the correct double-face printing, the relation between the pages on the front and rear surfaces is reversed before and after the page of abnormal image (blank paper). This also occurs when double-face documents are printed by double face printing.

Further, in the case of a digital copying machine having a memory for storing read images, images of the documents read by a scanner section can be temporarily stored and held in the memory. Therefore, it is possible to print the images in an order different from the reading order in which the images are read by the scanner section 4. Further, the images stored in the memory can be printed after all of the documents are read. However, in this case, it is necessary to substantially simultaneously effect the paper feeding operation of a document, scanning operation and printing operation so as to enhance the copying speed.

In the digital copying machine of first-in first-out (FIFO) system having the above memory, for first feeding paper which is first stacked by the double face printer, the printing for the first page, third page and fifth page is effected in this order at the same time as reading of the documents when single-face documents of plural pages are printed by double face printing. In this case, images of the documents read are stored into the memory, and at the same time, sheets of paper on one-side surfaces of which images of odd pages of the first page, third page and fifth page are printed are stacked in the double face printer.

Then, the sheets of paper on one-side surfaces of which images of the first page, third page and fifth page are printed are sequentially fed out from the double face printer, document images of the second page, fourth page and sixth page are printed on the rear surfaces of the sheets of printing paper and the sheets of printing paper are discharged. As a result, the first page/second page, third page/fourth page, fifth page/sixth page are printed on the front/rear surfaces of the respective sheets of paper as shown at (a) to (c) in FIG. 25.

Thus, wasting time caused by the mechanical structure is reduced and the copying speed is enhanced. In this system, if the document of third page is jammed to cause abnormal paper feeding and a failure in reading of the document occurs, images printed on the one-side surfaces of the sheets of paper stacked in the double face printer are the first page, abnormal image (blank paper), third page and fifth page, and if printing is made on the rear surfaces of the sheets of paper, the first page/second page, abnormal image (blank page)/fourth page, third page/sixth page, fifth page/blank page are obtained on the front/rear surfaces of the respective sheets of paper as shown at (a) to (d) in FIG. 27. The same result may be obtained in the case of double-face document.

In a device of first-in last-out (FILO) system having a memory for storing images, for first feeding paper which is last stacked by the double face printer, document images are printed on the front surfaces of sheets of paper in an order of the second page, fourth page, sixth page of the documents and the sheets of paper are stacked on the double face printer. Then, document images are printed on the rear surfaces of the sheets of paper stacked in the double face printer in an order of the fifth page, third page and first page and the sheets of paper are discharged. As a result, the sixth page/fifth page, fourth page/third page, second page/first page are printed on the front/rear surfaces of the respective sheets of paper as shown at (a) to (c) in FIG. 28.

In this case, if a failure in reading of the document of third page occurs, for example, images are printed on sheets of paper stacked in the double face printer in an order of the second page, abnormal image (blank paper), fourth page and sixth page. Then, if images are printed on the rear surfaces of the stacked sheets of paper, the sixth page/fifth page, abnormal image (blank paper)/third page, fourth page/first page, second page/blank paper are printed on the front/rear surfaces of the respective sheets of paper as shown at (a) to (d) in FIG. 29 and the relation between the pages on the front and rear surfaces becomes strange.

As described above, if a document jam occurs in the automatic document feeder when the double face printing is effected by use of the automatic document feeder, printing paper which is started to be fed at the same time is stacked in the double face printer with the surface thereof kept in a blank state. Since the paper stacked in the blank state is dealt with in the same manner as another sheet of paper which has been correctly printed and stacked when the printing for the rear surfaces thereof is started, the printing is made on the rear surface of the blank paper and the relation between the succeeding pages of the front and rear surfaces becomes strange.

BRIEF SUMMARY OF THE INVENTION

An object of this invention is to provide an image forming method for dealing with paper on which an erroneously read image is printed in the same manner as correctly printed paper when the double face printing is made and effecting the double face printing operation with the pages of the front and rear surfaces of sheets of paper set in order without shifting the pages of the front and rear surfaces of the sheets of paper.

According to one aspect of this invention there is provided an image forming method effected by use of an image forming apparatus including reading means for reading plural pages of documents in the unit of page, image forming means for forming images read in the unit of page by use of the reading means on first and second surfaces of an image forming medium, discharging means for discharging the image forming medium on which the images are formed by the image forming means, first supply means for supplying the image forming medium received in a paper feeding section to the image forming means, and second supply means for supplying the image forming medium on the first surface of which the image is formed by the image forming means to the image forming means with the first and second surfaces of the image forming medium reversed, comprising the steps of effecting a process for reading each of the documents of odd pages by use of the reading means, forming the image on the first surface of the image forming medium by use of the image forming means and supplying the image forming medium to the second supply means when document images of plural pages are formed on the first and second surfaces of the image forming media; determining whether reading of an image of the document to be formed on the first surface of the image forming medium is abnormal or not when the processing step is effected; reading the document of even page by use of the reading means if it is determined in the determining step that abnormal reading of the document does not occur, then supplying the image forming medium processed by the processing step to the image forming means by the second supply means, forming the image on the second surface of the image forming medium and discharging the image forming medium; and discharging the image forming medium by the discharging means without forming the image on the second surface of the image forming medium processed in the processing step if it is determined in the determining step that abnormal reading of the document occurs and re-starting the processing step starting from the document which is determined to be abnormally read.

According to another aspect of this invention, there is provided an image forming method effected by use of an image forming apparatus including reading means for reading plural pages of documents in the unit of page, first storage means for storing images of the documents of at least even pages read by the reading means, image forming means for forming images read in the unit of page by use of the reading means on first and second surfaces of an image forming medium, discharging means for discharging the image forming medium on which the images are formed by the image forming means, first supply means for supplying the image forming medium received in a paper feeding section to the image forming means, and second supply means for supplying the image forming medium to the image forming means with the first and second surfaces thereof reversed in the order in which the image forming medium is earlier received into the receiving section after the image forming media on which the images are formed by the image forming means are temporarily received into the receiving section, comprising the steps of effecting a process for reading the plural pages of documents by use of the reading means, forming the images of odd pages on the first surfaces of the image forming media and storing the image forming media in the receiving section, and storing the images of even pages into the first storage means when images of the plural pages of documents are formed on the first and second surfaces of the image forming media; determining whether reading of an image of the document to be formed on the first surface of the image forming medium is abnormal or not when the processing step is effected; storing abnormal reading into second storage means based on the order in which the image forming media are received into the receiving section when it is determined in the determining step that abnormal reading of the document occurs; receiving the image forming medium now processed into the receiving section when it is determined in the determining step that abnormal reading of the document occurs and then re-starting the process starting from the document which is determined to be abnormally read; and sequentially supplying the image forming media stored in the receiving section to the image forming means by the second supply means when the process for all of the documents of odd pages is completed by the above process, sequentially forming the images of the documents of even pages of the reading order stored in the first storage means on the second surfaces of the image forming media for which abnormal reading is not stored in the second storage means by use of the image forming means and discharging the image forming media by use of the discharging means, and discharging the image forming media for which abnormal reading is stored in the second storage means by use of the discharging means without forming the images by the image forming means.

According to still another aspect of this invention, there is provided an image forming method effected by use of an image forming apparatus including reading means for reading plural pages of documents in the unit of page, first storage means for storing images of the documents of at least odd pages read by the reading means, image forming means for forming images read in the unit of page by use of the reading means on first and second surfaces of an image forming medium, discharging means for discharging the image forming medium on which the images are formed by the image forming means, first supply means for supplying the image forming medium received in a paper feeding section to the image forming means, and second supply means for supplying the image forming medium to the image forming means with the first and second surfaces thereof reversed in the order in which the image forming medium is later received into the receiving section after the image forming media on which the images are formed by the image forming means are temporarily received into the receiving section, comprising the steps of effecting a process for sequentially reading the plural pages of documents by use of the reading means, storing images of the odd pages of documents into the first storage section, and forming the images of the even pages of documents on the first surfaces of the image forming media and storing the image forming media in the receiving section when images of the plural pages of documents are formed on the first and second surfaces of the image forming media; determining whether reading of an image of the even page of document to be formed on the first surface of the image forming medium is abnormal or not when the above processing step is effected; storing abnormal reading into second storage means based on the order in which the image forming media are received into the receiving section when it is determined in the determining step that abnormal reading of the document occurs; receiving the image forming medium now processed into the receiving section when it is determined in the determining step that abnormal reading of the document occurs and then re-starting the process starting from the document which is determined to be abnormally read; sequentially supplying the image forming media stored in the receiving section to the image forming means by the second supply means when the process for all of the documents of even pages is completed by the above process; sequentially forming the images of the documents of odd pages set in a reverse order of the reading order stored in the first storage means on the second surfaces of the image forming media for which abnormal reading is not stored in the second storage means by use of the image forming means and discharging the image forming media by use of the discharging means; and discharging the image forming media for which abnormal reading is stored in the second storage means by use of the discharging means without forming the images on the second surfaces thereof by the image forming means.

According to another aspect of this invention, there is provided an image forming method effected by use of an image forming apparatus including reading means for reading plural pages of documents in the unit of page, storage means for storing images of the documents of at least alternate pages read by the reading means, image forming means for forming images read in the unit of page by use of the reading means on first and second surfaces of an image forming medium, first supply means for supplying the image forming medium received in a paper feeding section to the image forming means, and second supply means for receiving the image forming media on the first surfaces of which the images are formed by the image forming means into a temporary receiving section and then supplying the image forming medium received in the receiving section to the image forming means with the first and second surfaces thereof reversed, comprising a fist step of sequentially reading the plural pages of documents by use of the reading means, forming images of the documents of alternate pages on the first surfaces of the image forming media, and storing images of the documents of alternate pages which are different from the images of the documents of alternate pages formed on the first surfaces of the image forming media into the storage means in a reading order when images of the plural pages of documents are formed on the first and second surfaces of the image forming media; a second step of sequentially supplying the image forming media received in the receiving section to the image forming means by the second supply means and forming images stored in the storage means on the second surfaces of the image forming media in an order in which the image forming media are supplied when a process in the first step is completed; a step of receiving the image forming medium now processed into the receiving section when abnormal reading of the document occurs at the time of formation of the image on the first surface in the first step and re-starting the process of the first step starting from the document of a page for which abnormal reading has occurred; and a step of shifting the page of abnormal reading and succeeding pages by one page according to an order in which the image forming media are supplied without forming the image of the page stored in the storage means when the image forming medium which is stored in the receiving section and for which abnormal reading occurs at the time of image formation is supplied at the time of effecting the process of the second step after the process of the first step is re-started.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 25 is a view for illustrating the conventional double face printing by use of a copying machine of FIFO system using a memory or using no memory;

FIG. 26 is a view for illustrating the conventional double face printing using no memory; and FIGS. 27 to 29 are views for illustrating the conventional double face printing by use of a double face printer of FILO system using a memory.

DETAILED DESCRIPTION OF THE INVENTION

There will now be described embodiments of this invention with reference to the accompanying drawings.

Figure 1:
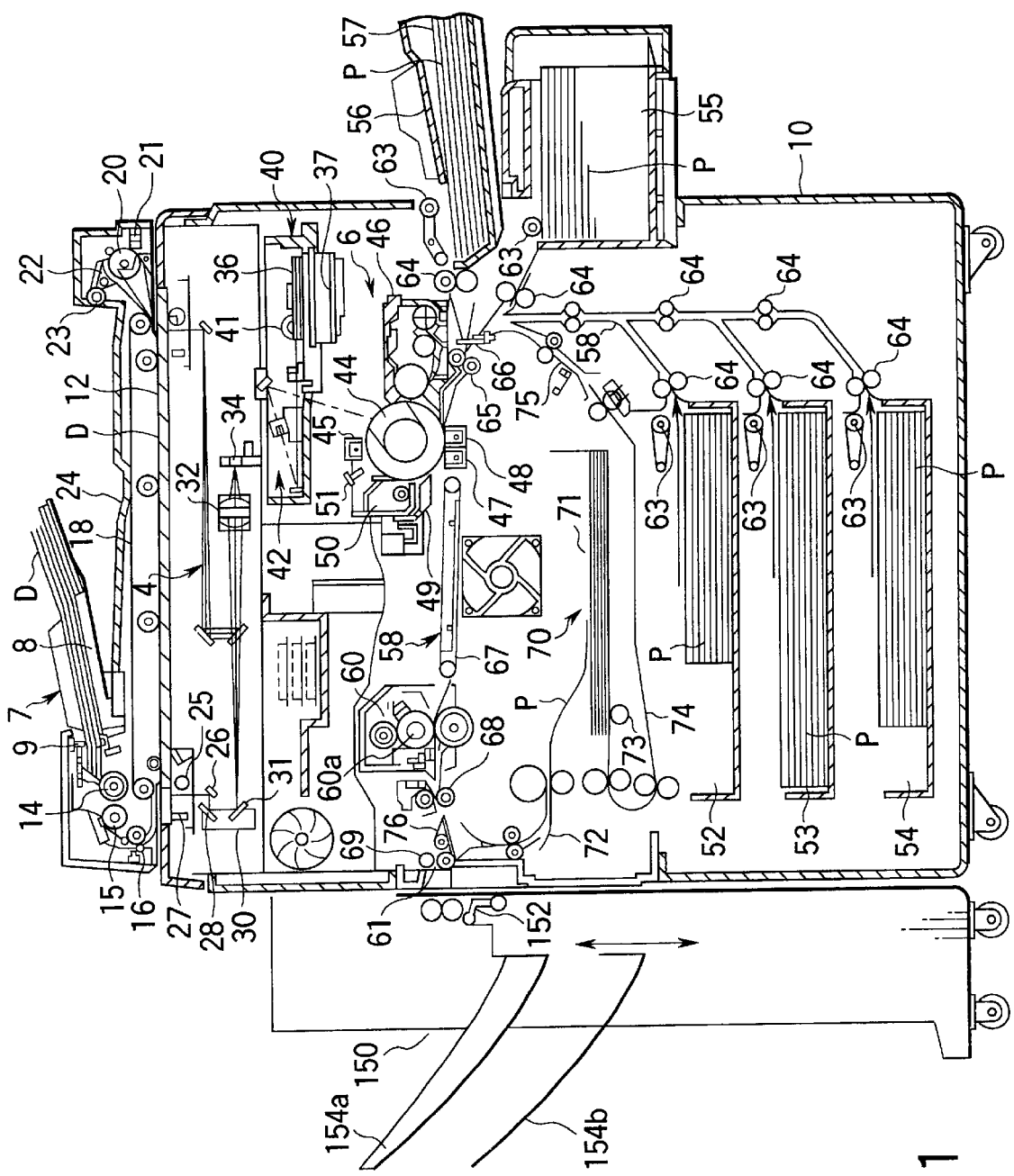
FIG. 1 is a cross sectional view showing the schematic construction of a digital copying machine as an example of a image forming apparatus, for illustrating one embodiment of this invention.

FIG. 1 is a cross sectional view showing the internal structure of a digital copying machine as an example of a image forming apparatus of this invention.

As shown in FIG. 1, the digital copying machine includes a device main body 10 and a scanner section 4 functioning as reading means which will be described later and a printer section 6 functioning as image forming means are provided in the device main body 10.

On the upper surface of the device main body 10, a document table 12 formed of transparent glass on which an object to be read or a document D is placed is disposed. Further, on the upper surface of the device main body 10, an automatic document feeder (which is hereinafter referred to as an ADF) 7 for automatically feeding a document onto the document table 12 is disposed. The ADF 7 is disposed to be set into the open or closed state with respect to the document table 12 and functions as a document cover for setting the document D placed on the document table 12 in close contact with the document table 12.

The ADF 7 includes a document tray 8, empty sensor 9, pickup roller 14, paper feeding roller 15, aligning roller pair 16 and conveyer belt 18. The document tray 8 is a portion on which the document D is set. The empty. sensor 9 detects the presence or absence of the document. The pickup roller 14 takes out a document from the document tray 8 one by one. The paper feeding roller 15 is a roller for feeding the taken-out document. The aligning roller pair 16 aligns the front end of the document. The conveyer belt 18 is disposed to cover substantially the entire portion of the document table 12.

A plurality of documents set with the face up on the document tray 8 are taken out in order from the bottom page, that is, the last page, aligned by the aligning roller pair 16 and then fed to a preset position of the document table 12 by the conveyer belt 18.

In the ADF 7, a reversing roller 20, non-reverse sensor 21, flapper 22 and paper discharging roller 23 are disposed on the end portion opposite to the aligning roller pair 16 with respect to the conveyer belt 18. The document D from which image information is read by the scanner section 4 which will be described later is fed out from the document table 12 by the conveyer belt 18 and discharged onto a document discharging section 24 on the upper surface of the ADF 7 via the reversing roller 20, flapper 22 and paper discharging roller 23. When the rear surface of the document D is read, the position of the flapper 22 is switched and the document D fed by the conveyer belt 18 is reversed by the reversing roller 20 and then fed to the preset position on the document table 12 by the conveyer belt 18.

The scanner 4 disposed in the device main body 10 includes an exposure lamp 25 and first mirror 26. The exposure lamp 25 is a light source for illuminating the document D placed on the document table 12. The first mirror 26 deflects reflection light from the document D in a preset direction. The exposure lamp 25 and first mirror 26 are attached to a first carriage 27 which is disposed below the document table 12.

The first carriage 27 is disposed to be movable in parallel to the document table 12 and is reciprocally moved below the document table 12 by means of a driving motor via a toothed belt (not shown) or the like.

Further, a second carriage 28 which is movable in parallel to the document table 12 is disposed below the document table 12. A second mirror 30 and third mirror 31 for deflecting reflection light from the document D deflected by the first mirror 26 in order are disposed at right angles with each other on the second carriage 28. The second carriage 28 is driven by the toothed belt or the like for driving the first carriage 27 to follow the first carriage 27 and is moved in parallel to the document table 12 at a speed which is half the speed of the first carriage.

Below the document table 12, an image forming lens 32 for focusing the reflected light from the third mirror 31 on the second carriage 28 and a CCD sensor 34 for receiving the reflected light focused by the image forming lens and photoelectrically converting the reflected light are disposed. The image forming lens 32 is disposed to be movable via a driving mechanism in a plane containing the optical axis of light deflected by the third mirror 31 and forms an image by use of the reflected light with desired magnification by the movement thereof. Then, the CCD sensor 34 photoelectrically converts the incident reflected light and outputs an electrical signal corresponding to the read image of the document D.

The printer section 6 includes a laser exposure unit 40 acting as latent image forming means. The laser exposure unit 40 includes a semiconductor laser 41, polygon mirror 36, polygon motor 37 and optical system 42. The semiconductor laser 41 is a light source for exposure. The polygon mirror 36 is a scanning member for continuously deflecting laser light emitted from the semiconductor laser 41. The polygon motor 37 is a scanning motor for rotating and driving the polygon mirror 36 at a preset rotation speed to be described later. The optical system 42 deflects laser light from the polygon mirrors 36, 37 to direct the laser light to a photosensitive drum 44 which will be described later. The laser exposure unit 40 with the above construction is fixedly supported on a support frame (not shown) of the device main body 10.

The ON/OFF state of the semiconductor laser 41 is controlled according to image information of the document D read by the scanner section 4 or document information for facsimile transmission or reception and the laser light emitted from the semiconductor laser 41 is directed to the photosensitive drum 44 via the polygon mirror 36 and optical system 42 to scan the outer surface of the photosensitive drum 44 and form a latent image on the outer surface of the photosensitive drum 44.

Further, the printer section 6 has the photosensitive drum 44 which is rotatable as an image carrier disposed in substantially the central portion of the device main body 10. The outer surface of the photosensitive drum 44 is exposed by the laser light emitted from the semiconductor laser 41 to form a desired latent image. An electric charger 45, developing unit 46 and separation charger 47 are integrally arranged around the photosensitive drum 44. The electric charger 45 charges a preset charge on the outer surface of the drum. The developing unit 46 supplies toner as a developing agent to the electrostatic latent image formed on the outer surface of the photosensitive drum 44 to develop the latent image with a desired image concentration. The separation charger 47 separates an image transferring member, that is, copy paper (paper) P fed from a paper cassette to be described later from the photosensitive drum 44.

Further, a transfer charger 48, separation claw 49, cleaning unit 50 and discharging unit 51 are disposed in this order around the photosensitive drum 44. The transfer charger 48 transfers an toner image formed on the photosensitive drum 44 to the copy paper P. The separation claw 49 separates the copy paper P from the outer surface of the photosensitive drum 44. The cleaning unit 50 cleans the remaining toner left on the outer surface of the photosensitive drum 44. The discharging unit 51 discharges the outer surface of the photosensitive drum 44.

In the lower portion of the device main body 10, an upper cassette 52, intermediate cassette 53 and lower cassette 54 which can be withdrawn from the device main body are disposed in the stacked state. Sheets of paper with different sizes are set in the respective cassettes. A large capacity feeder 55 is disposed on the side portion of the cassettes. In the large capacity feeder 55, approx. 3000 sheets of copy paper P with a size which is frequently used, for example, A4-size copy paper P are received. Further, a paper feeding cassette 57 which is also used as a manual paper-feeding tray 56 is removably mounted above the large capacity feeder 55.

In the device main body 10, a feeding path 58 extending from the cassettes and large capacity feeder 55 through the transfer section which lies between the photosensitive drum 44 and the transfer charger 48 is formed. At the end of the feeding path 58, a fixing unit 60 having a fixing lamp 60a is disposed. A discharging port 61 is formed in the side wall of the device main body 10 in position opposite to the fixing unit 60 and a sorter unit 81 is mounted on the discharging port 61.

Pickup rollers 63 each for taking out copy paper P one by one from the cassette or large capacity feeder are disposed near the upper cassette 52, intermediate cassette 53, lower cassette 54 and paper feeding cassette 57 and near the large capacity feeder 55. A large number of paper feeding roller pairs 64 for feeding the copy paper P taken out from the pickup roller 63 through the feeding path 58 are disposed along the feeding path 58.

A resist roller pair 65 is disposed on the upstream side of the photosensitive drum 44 in the feeding path 58. The resist roller pair 65 corrects the inclination of the taken-out copy paper P, aligns the front end of the toner image on the photosensitive drum 44 with the front end of the copy paper P and feeds the copy paper P to the transfer section at the same speed as the moving speed of the outer surface of the photosensitive drum 44. In front of the resist roller 65, that is, on the paper feeding roller 64 side, a prior-to-aligning sensor 66 for detecting arrival of the copy paper P is disposed.

The copy paper P taken out from the cassette or large capacity feeder 55 by means of the pickup roller 63 is fed to the resist roller pair 65 by the paper feeding roller pair 64. Then, the copy paper P is fed to the transfer section after the front end thereof is aligned by the resist roller pair 65.

In the transfer section, a developing agent image or toner image formed on the photosensitive drum 44 is transferred onto the copy paper P by the transfer charger 48. The copy paper P on which the toner image has been transferred is separated from the outer surface of the photosensitive drum 44 by the action of the separation charger 47 and separation claw 49 and fed to the fixing unit 60 via the conveyer belt 67 constructing part of the feeding path 52. Then, after the developing agent image is melted and fixed on the copy paper P by the fixing unit 60, the copy paper P is discharged onto a finisher 81 via the discharging port 61 by means of the paper feeding roller pair 68 and paper discharging roller pair 69.

Below the feeding path 58, a double face printer 70 of first-in first-out (FIFO) system for reversing or turning over the copy paper P which has passed through the fixing unit 60 and feeding the copy paper to the resist roller pair 65 again is disposed.

The double face printer 70 includes a temporary storage section (receiving section) 71, feeding path 72, pickup roller 73, feeding path 74 and paper feeding roller 75. The temporary storage section (receiving section) 71 temporarily stores (stacks) the copy paper P. The feeding path 72 is branched from the feeding path 58 to guide the copy paper P which has passed through the fixing unit 60 to the temporary storage section 71. The pickup roller 73 takes out the copy paper P stored in the temporary storage section 71 one by one in the storing order. The paper feeding roller 75 feeds the taken-out paper to the resist roller pair 65 via the feeding path 74.

Further, a distribution gate 76 for selectively distributing the copy paper P to the discharging port 61 or the feeding path 72 of the double face printer 70 is disposed in the branching portion of the feeding path 58 and the feeding path 72.

When the double face copying operation is effected, the copy paper P which has passed through the fixing unit 60 is directed to the feeding path 72 by the distributing gate 76, sequentially stacked and temporarily stored in the temporary storing section 71, and then the stacked sheets of copy paper P are sequentially taken out starting from the copy paper at the bottom by use of the pickup roller 73, reversed or turned over by the feeding path 74 and fed to the resist roller pair 65. Then, the copy paper P is fed to the transfer section again after it is aligned by the resist roller pair 65 and the toner image is transferred on the rear surface of the copy paper P. After this, the copy paper P is discharged to the finisher 81 via the feeding path 58, fixing unit 60 and paper discharging roller 69.

The finisher 81 is portion for stapling and storing the discharged sheets of paper in the unit of copy set. Each time one sheet of copy paper P to be stapled is discharged from the discharging port 61, the copy paper P is pushed to a position in which the copy paper is stapled and arranged by a guide bar (not shown). When all of the sheets of copy paper P to be stapled have been discharged, a paper pressing arm 152 presses the copy paper P of one copy set discharged and a stapler unit (not shown) staples the copy paper. After this, the guide bar is lowered and the copy paper P which has been stapled is discharged in the unit of copy set to a finisher discharging tray (first discharging section) 154a by a finisher discharging roller 155. The amount by which the finisher discharging tray 154a is lowered is roughly determined by the number of sheets of copy paper P discharged and it is lowered in a stepwise manner each time the copy paper is discharged in the unit of copy set. A guide bar 151 for aligning the discharged copy paper P is set in a high position so as not to abut against the stapled copy paper P already set on the finisher discharging tray 154a.

Further, error paper or the like on which a document image is not correctly printed is discharged to a finisher discharging tray (second discharging section) 154b which is disposed in the finisher 81 and disposed to be movable in the vertical direction like the finisher discharging tray 154a.

Further, in the front upper portion of the device main body, an operation panel (not shown) for inputting a copy starting signal for starting the copy operation and various copy conditions is disposed.

Figure 2:
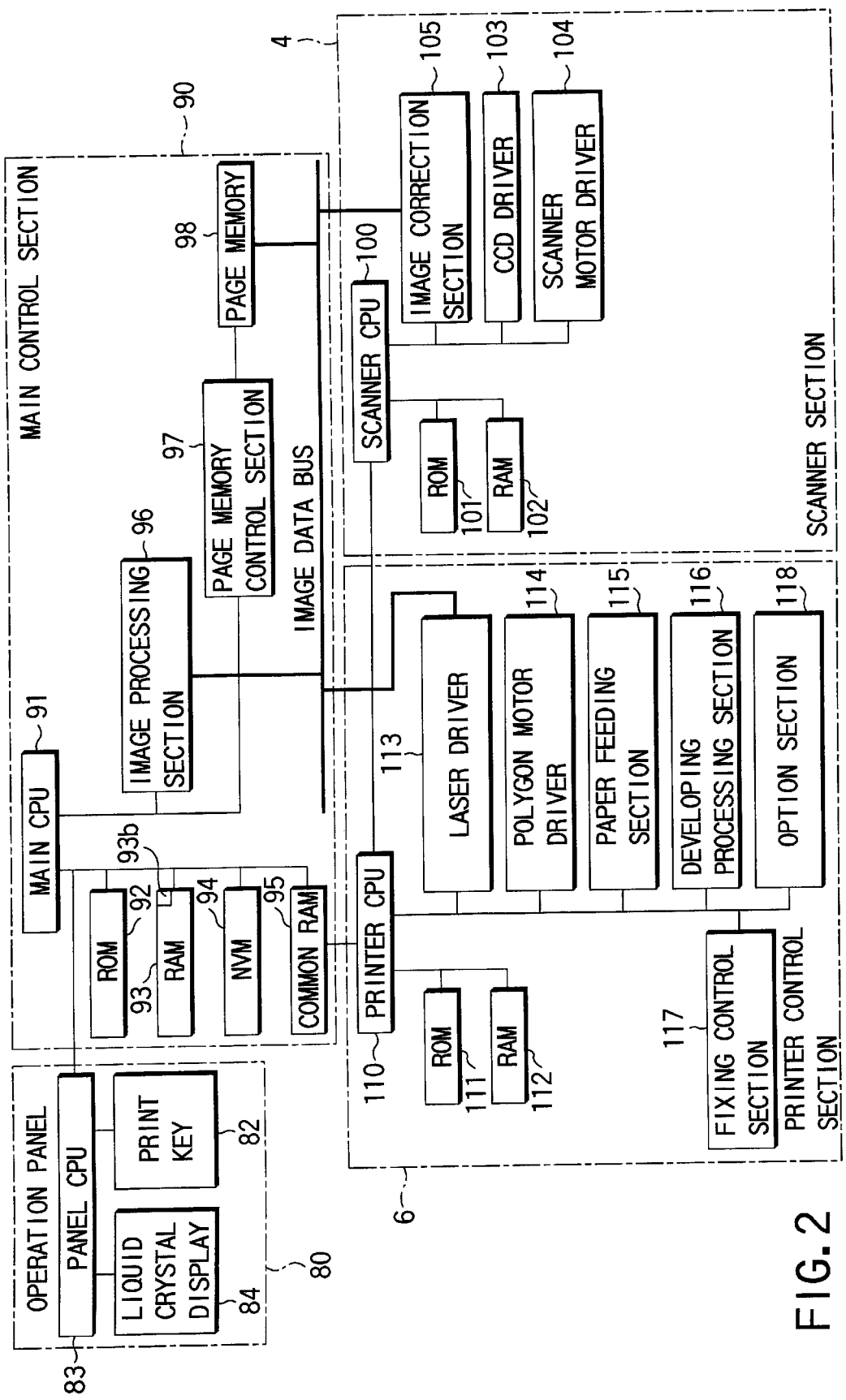
FIG. 2 is a block diagram for illustrating the control system of the digital copying machine.

FIG. 2 is a block diagram schematically showing the electrical connection of the digital copying machine of FIG. 1 and the flow of control signals.

As shown in FIG. 2, in the digital copying machine, the control operation is effected by use of three CPUs including a main CPU 91 in a main control section 90, a scanner CPU 100 of the scanner section 4 and a printer CPU 110 of the printer section 6. The main CPU 91 effects bi-directional communication with the printer CPU 110 via a common RAM 95. The main CPU 91 issues a specification of the operation to the printer CPU 110. The printer CPU 110 sends back a status signal in response to the specification of the operation from the main CPU 91. The printer CPU 110 and the scanner CPU 100 effect serial communication and the printer CPU 110 issues a specification of the operation. The scanner CPU 100 sends back a status signal in response to the specification of the operation from the printer CPU 110.

The operation panel 80 is connected to the main CPU 91.

The main control section 90 includes the main CPU 91, ROM 92, RAM 93, NVM 94, common RAM 95, image processing section 96, page memory control section 97 and page memory 98.

The main CPU 91 controls the whole portion of the main control section 90.

The ROM 92 stores various control programs.

The RAM 93 temporarily stores data.

The NVM (nonvolatile random access memory (RAM)) 94 is a nonvolatile memory backed up by a battery (not shown) and data of the NVM 94 can be held even when the power supply is cut off.

The common RAM 95 is used for effecting bi-directional communication between the main CPU 91 and the printer CPU 110.

The image processing section 96 stores image data subjected to the image process such as trimming, masking, image compression or expansion into a line memory.

The page memory control section 97 stores image data into the page memory 98 or reads out image data from the page memory 98. The page memory 98 has an area for storing image data of a plurality of pages and is constructed to store data obtained by compressing image data from the scanner section 4 for each page.

The RAM 93 includes a status table 93a for attaching a stack number to paper to be stacked for each sheet of paper when the paper is stacked on the temporary storage section 71 of the double face printer 70 and managing the state indicating whether a correctly read image or an erroneously read image is printed on the paper to be stacked.

The scanner section 4 includes the scanner CPU 100, ROM 101, RAM 102, CCD driver 103, scanner motor driver 104, image correcting section 105, exposure lamp control section 106 and driver 107 for driving a moving mechanism 108.

The scanner CPU 100 controls the whole portion of the scanner section 4. The ROM 101 stores control programs and the like. The RAM 102 stores various data items. The CCD driver 103 drives the CCD sensor 34. The scanner motor driver 104 controls the rotation movement of the driving motor 38 for driving the first and second carriages 27, 28 of the exposure lamp 25 and the mirrors 26, 30, 31. The image correcting section 105 effects the image processing processes of a gamma correction circuit and shading correction circuit for correcting a variation in the threshold level with respect to an output signal of the CCD sensor 34 caused by a variation in the ambient temperature or a fluctuation of the CCD sensor 34 and an A/D converter circuit for converting an analog signal from the CCD sensor 34 into a digital signal. The exposure lamp control section 106 controls the exposure lamp 25. The driver 107 drives the moving mechanism 108 for moving the image forming lens 32 to a position corresponding to the set magnification.

The printer section 6 includes the printer CPU 110, ROM 111, RAM 112, LD drive circuit 113, polygon motor drive circuit 114, paper feeding section 115, development processing section 116, fixing processing section 117, option section 118 and main motor drive circuit 119.

The printer CPU 110 controls the whole portion of the printer section 6. The ROM 111 stores control programs and the like. The RAM 112 stores various data items. The LD drive circuit 113 controls the ON/OFF states of light emission by the semiconductor laser 41. The polygon motor drive circuit 114 controls the rotation movement of the polygon motor 37 of the laser unit 40. The paper feeding section 115 controls feeding of the paper P by the feeding path 58. The development processing section 116 effects the charging, developing and transferring processes by use of the electric charger 45, developing unit 46 and transfer charger 48. The fixing processing section 117 controls the fixing unit 60. The main motor drive circuit 119 controls the discharging paper detecting sensor 62, prior-to-aligning sensor 66, option section 118 and the rotation movement of the main motor 77.

Further, the image processing section 96, page memory control section 97 and page memory 98 are connected via an image data bus 120.

Figure 3:
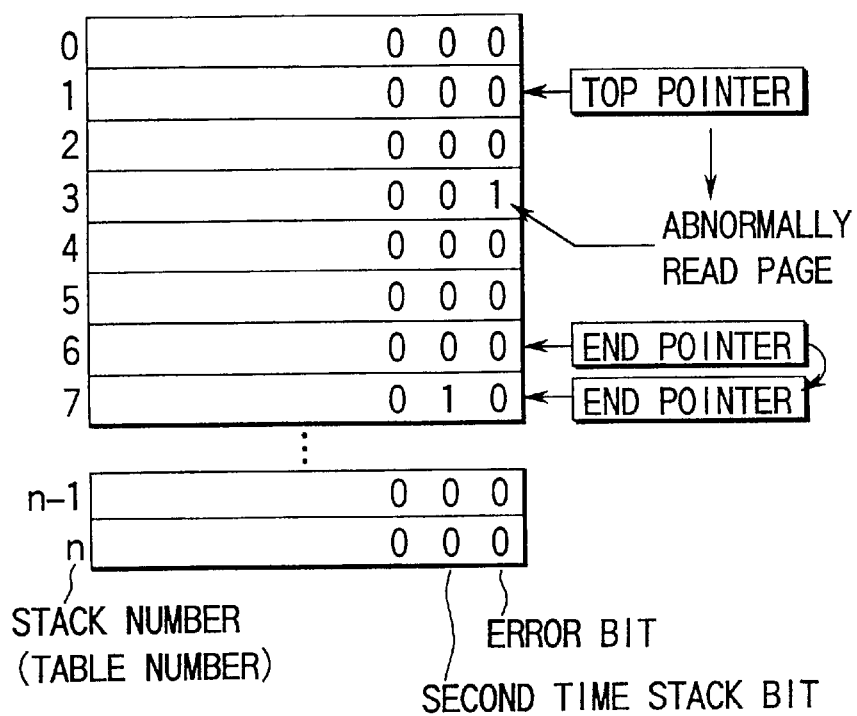
FIG. 3 is a diagram showing one example of a status table.

FIG. 3 shows an example of the status table 93a in the RAM 93.

As shown in FIG. 3, stack numbers (table numbers) of a number larger than the number by which the sheets of paper can be stacked in the double face printer 70 are prepared. When the paper is stacked in the double face printer 70, a stack number is attached to the paper to be stacked and the printing status corresponding to the stack number is written. At this time, in the status table 93a, the top and end of the stack numbers for the sheets of paper stacked in the temporary storage section 71 are indicated by a top pointer indicating the top of the stack numbers and an end pointer indicating the end of the stack numbers.

For example, if 10 sheets of single-face documents are printed by double face printing, images of the first, third, fifth, seventh and ninth pages of the documents are printed in this order on the sheets of paper and then the sheets of paper are stacked in the temporary storage section 71 in the double face printer 70.

At this time, for example, if the fifth page of the document fails to be fed, abnormal reading occurs and an abnormal image such as a blank image is printed on the paper and the printed paper is stacked in the double face printer 70, then the error bit of the stack number "3" is set to "1" as shown in FIG. 3.

After this, if the user re-starts reading of the document of fifth page and the documents of fifth, seventh and ninth pages are correctly read in this order and printed, a status (error bit "0") indicating that printing is correctly made on the paper of the stack numbers "4", "5", "6" is written at the time of stacking the paper in the double face printer 70. As a result, a status of the stack numbers "1" to "6" is stored into the status table 93a.

Further, when the paper (error paper) on which the abnormal image is printed is finally discharged, the paper P on which the abnormal image having the error bit "1" is printed is taken out, the paper is stacked in the temporary storage section 71 without printing any image thereon. In this case, when the paper is stacked in the temporary storage section 71 again, a stack number for the paper is newly attached and the second-time error bit is set to "1" and stored in the status table 93a.

For example, in the above example, the paper of the stack number "3" is taken out and stacked in the temporary storage section 71 without printing any image thereon. At this time, as shown in FIG. 3, a second-time error bit is set to "1" as the stack number "7" and the end pointer is changed to the stack number "7" and stored into the status table 93a.

Next, a case wherein a plurality of documents on the ADF 7 are printed by double face printing in the above digital copying machine having the ADF 7, double face printer 70 of FIFO system and page memory 98 is explained.

The digital copying machine has a mode (automatic paper selection, automatic magnification selection) in which the document D placed on the document table 12 is detected by a detector (not shown) and the paper size corresponding to the document size is selected and a mode in which the document D of a size corresponding to the paper size specified by the user is read and copied without considering the document size.

Since it is necessary to determine a read size and the size of the paper P corresponding to the read size after feeding the document D by the ADF 7 and detecting the document size when the document size is taken into consideration, it is impossible to feed the document D at the same time as feeding the paper P.

However, if a document image is copied on the paper P of a size specified by the user, it is not necessary to take the document size into consideration. In this case, since reading of the document D is effected according to the paper size specified by the user, determination of the reading range of the document D can be made before detecting the document size. As a result, it becomes possible to simultaneously feed the document D from the ADF 7 and feed the paper P from the paper feeding cassette.

Figure 4:
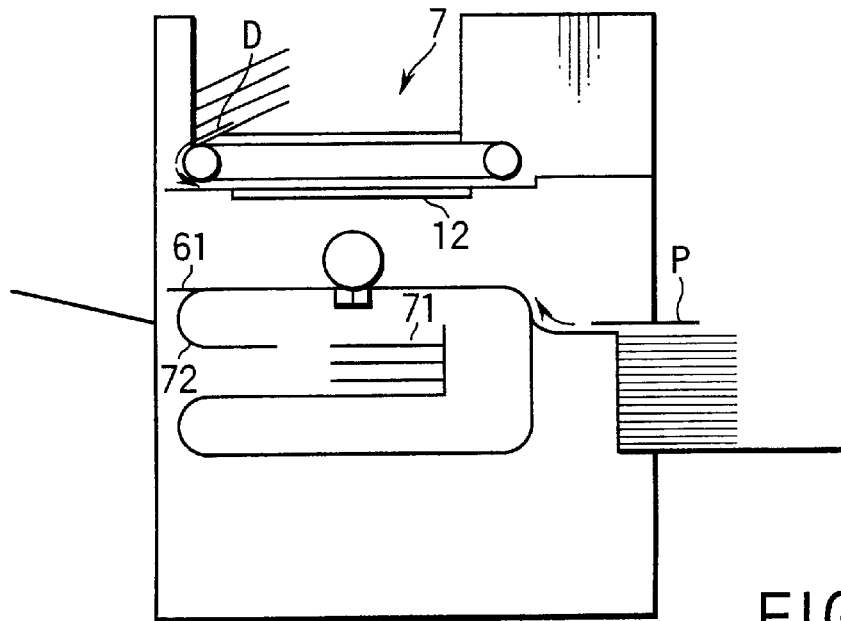
FIG. 4 is a view for illustrating the operation of a double face printer of FIFO system.

Therefore, in a case where the document D is fed from the ADF 7 and the document image is copied on the paper P of a size specified by the user, an attempt is made to start feeding of the paper P at the same time that the document D is started to be fed by the ADF 7 as shown in FIG. 4 and set the timing of start of reading the document D to the same timing as the timing of termination of feeding the paper P (start of printing an image on the paper P) to enhance the copying speed.

For example, in a case where 10 single-face documents D placed on the ADF 7 are copied on 5 sheets of double-face paper P, the documents D of the first, third, fifth, seventh and ninth pages, that is, odd pages are printed on the front surfaces of the five sheets of paper P in the copying machine having the page memory 98 by use of the double face printer 70 of FIFO system. Therefore, feeding of the documents D of odd pages is effected at the same time as feeding of the respective sheets of paper P.

Figure 5:
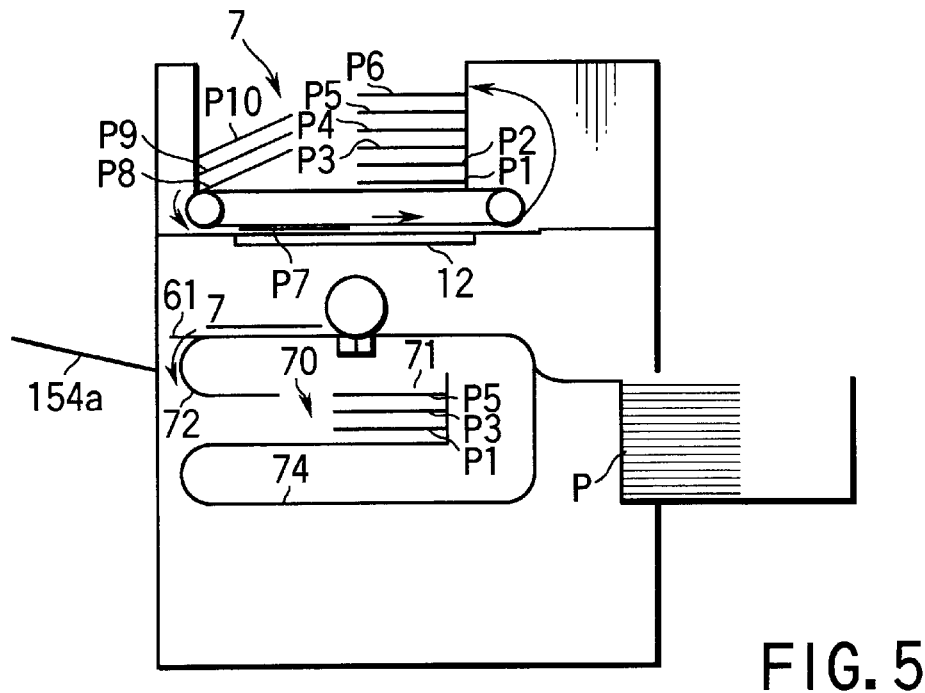
FIGS. 5 to 13 are views for illustrating one example of the double face printing operation by the double face printer of FIFO system.

In this case, as shown in FIG. 5, the documents D on the ADF 7 are sequentially fed so as to effect feeding of the documents D of odd pages at the same time as feeding of the respective sheets of paper P and the read images of the documents D of even pages are stored into the page memory 98.

Figure 6:
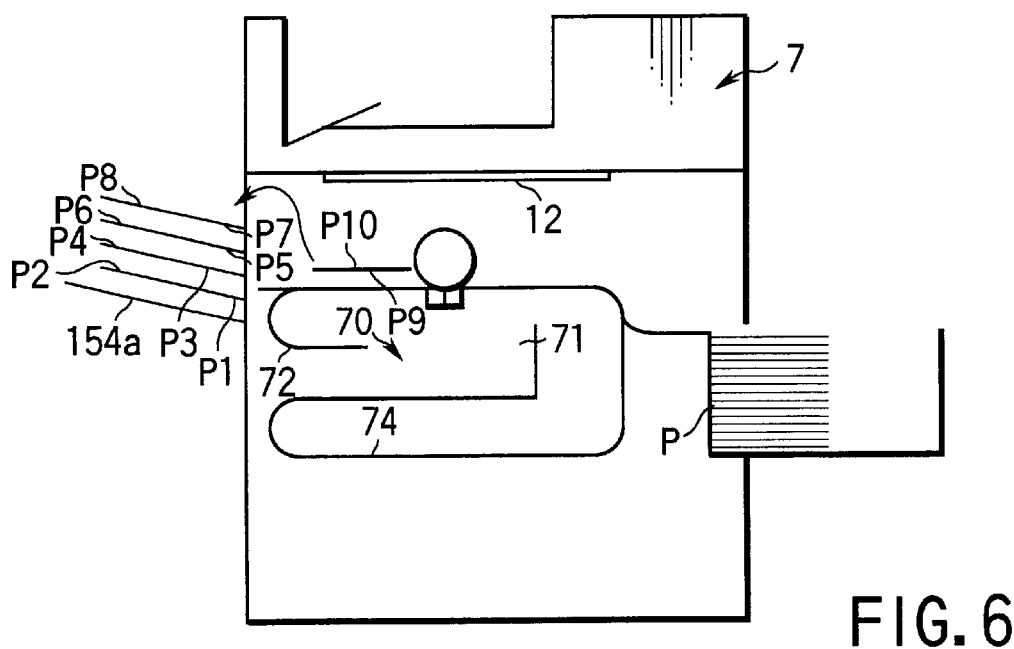

After the sheets of paper P on which the read images of the documents D of odd pages are printed are temporarily stacked in the temporary storage section 71, the sheets of paper P are sequentially taken out from the temporary storage section 71 and the read images of the documents D of even pages stored in the page memory 98 are sequentially printed on the rear surfaces of the sheets of paper P. As a result, as shown in FIG. 6, images of the 10 single-face documents D are printed on both surfaces of the 5 sheets of paper P.

However, it is unknown to succeed or fail in feeding the document D by the ADF 7 when feeding of the paper P is started. Therefore, if the document D fails to be fed by the ADF 7, the paper P which is already started to be fed is stacked in the temporary storage section 71 after the paper is made in a blank state or an abnormal state such as a blank state read when the document D fails to be fed is printed on the paper.

Figure 7:
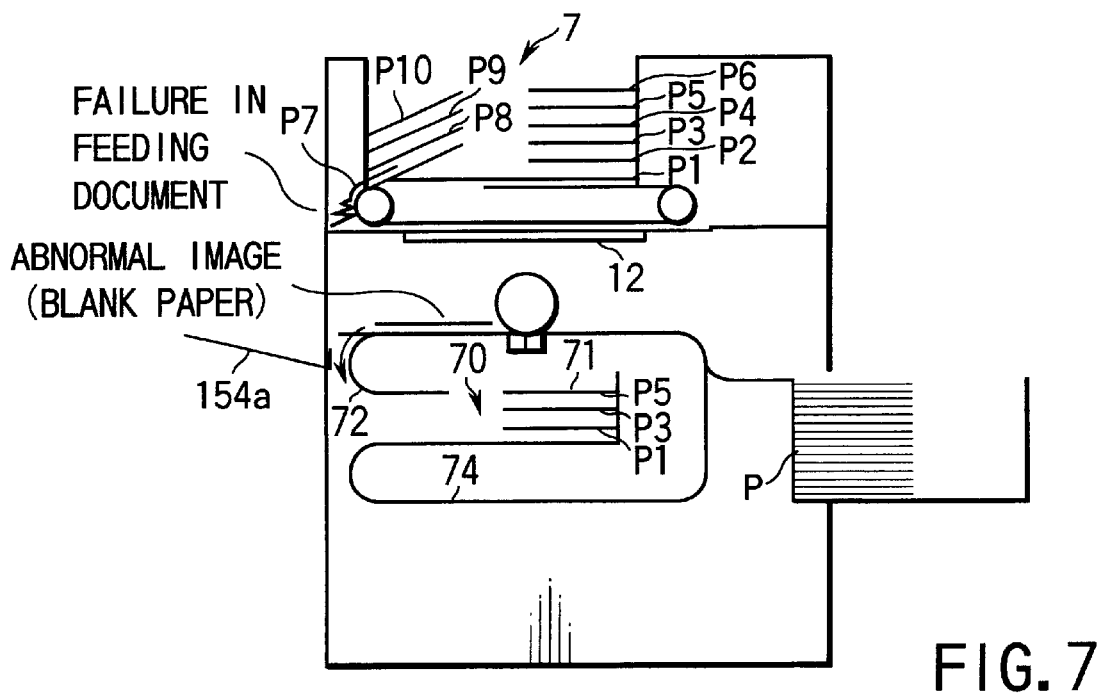

For example, as shown in FIG. 7, if a jam of the document D occurs in the ADF 7 when the seventh document D is fed, the copy paper P which is started to be fed from the paper feeding cassette so as to print the seventh page of the document D is stacked in the temporary storage section 71 without printing any image thereon. As a result, the paper on which no image is printed is stacked in a position following the sheets of paper on the front surfaces of which the first, third and fifth pages of document images are printed.

Figure 8:
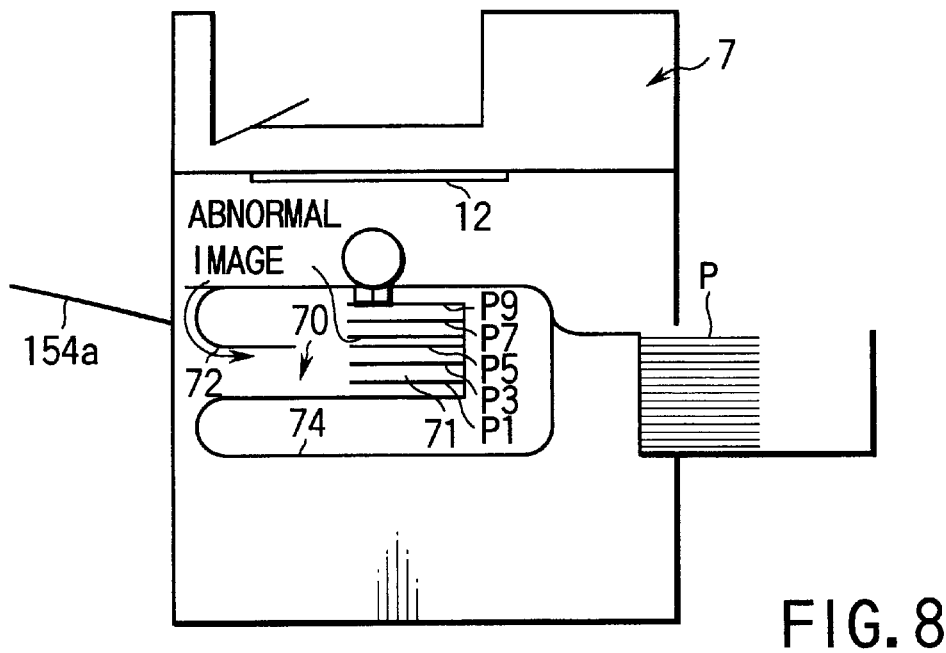

After this, the user takes out the document D which fails to be fed, places the seventh and succeeding pages of the documents D on the ADF 7 again and specifies re-starting of the copying operation. Then, as shown in FIG. 8, the documents D on the ADF 7 are sequentially fed, images of the documents D of odd pages are printed on the front surfaces of the sheets of paper P fed from the paper feeding cassette and the sheets of printed paper P are sequentially stacked in the temporary storage section 71.

If the document D becomes no more present on the ADF 7, the sheets of paper stacked in the temporary storage section 71 are sequentially taken out, read images of the documents D of even pages stored in the page memory 98 are sequentially read out in the order of increasing pages and printed and then the printed paper is discharged to the discharging tray 154a.

Figure 9:
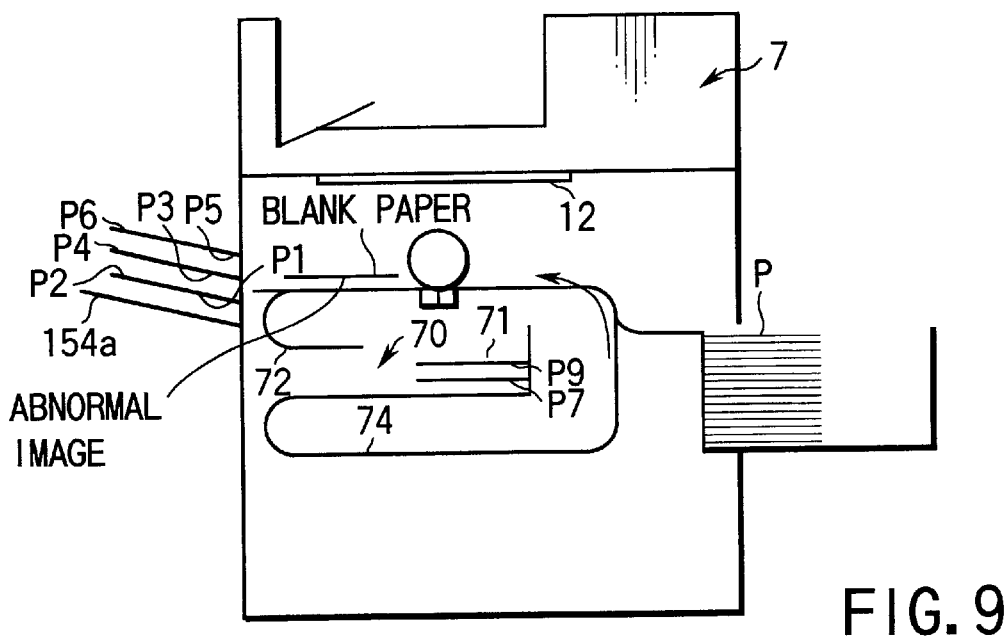
Figure 10:
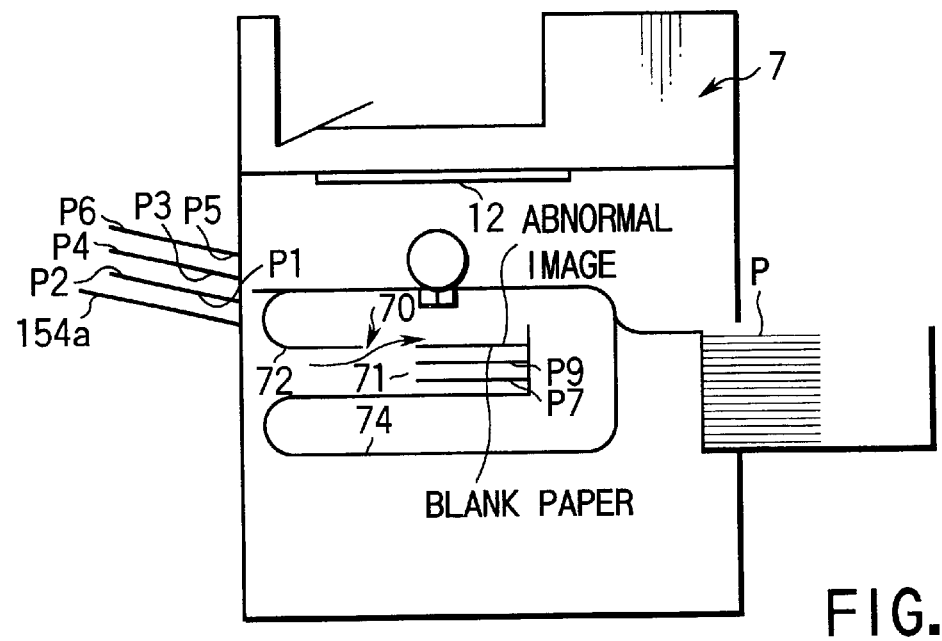

At this time, as shown in FIG. 9, if the paper P on which the abnormal image is printed is taken out, no image is printed on the rear surface of the paper. Then, as shown in FIG. 10, the paper P is received into the temporary storage section 71 again so as to be taken out after the sheets of paper P on which the seventh and ninth pages are printed and which have been temporarily stored after the paper P.

Figure 11:
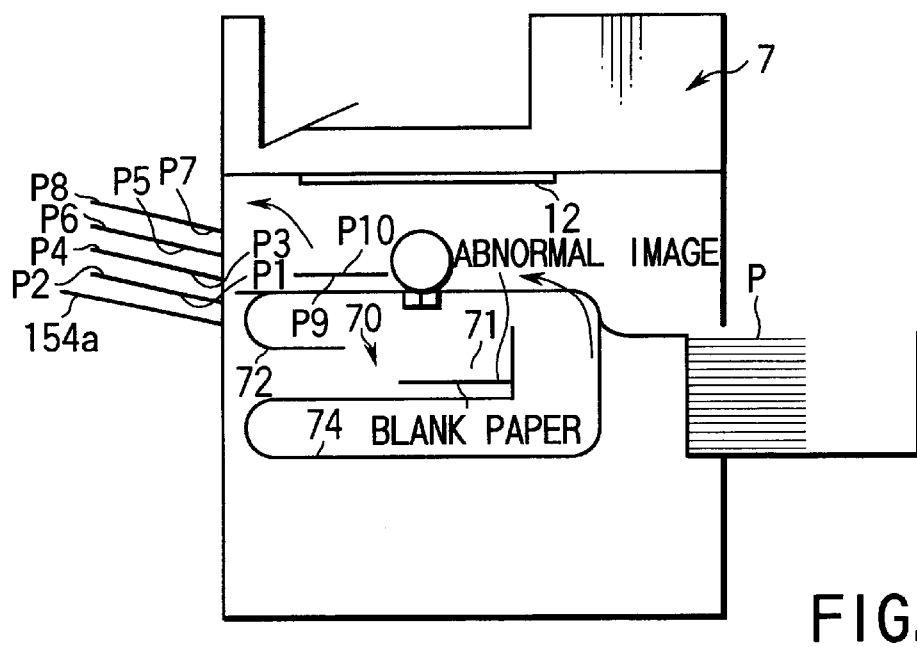
Figure 12:
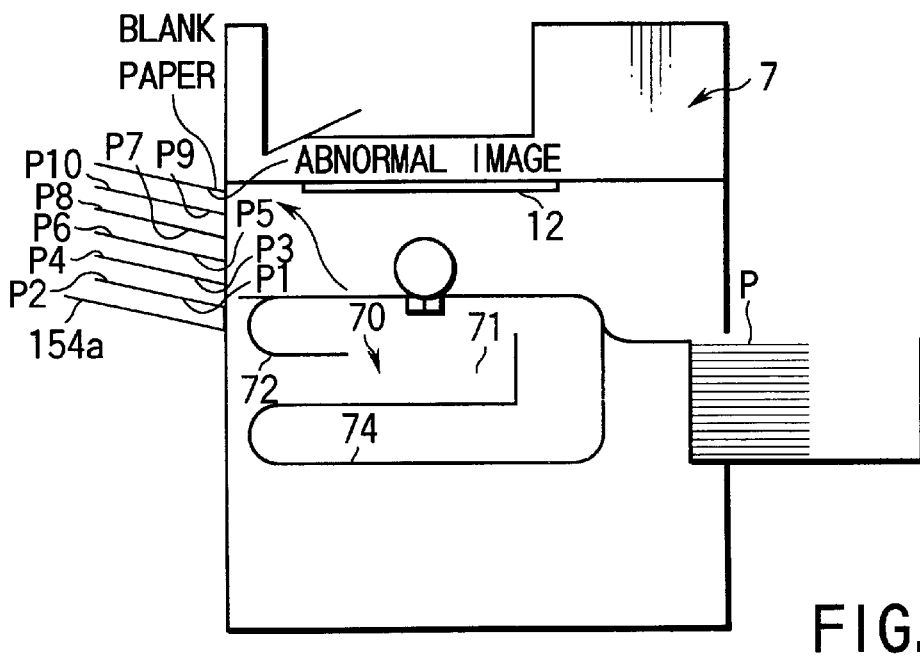

Next, as shown in FIG. 11, if a document image of the tenth page is printed on the rear surface of the paper P on the front surface of which the ninth page is printed and then the printed paper is discharged, the 5 sheets of paper P on both surfaces of which the document images of the first to tenth pages are printed are discharged in a correct order to the discharging tray 154a. After this, as shown in FIG. 12, the paper P on which the abnormal image is printed and which is stored in the temporary storage section 71 is discharged onto the discharging tray 154a.

In the state shown in FIG. 9, it is possible to discharge the paper P on which the abnormal image is printed to a discharging tray which is different from the discharging tray for the correctly printed paper.

Figure 13:
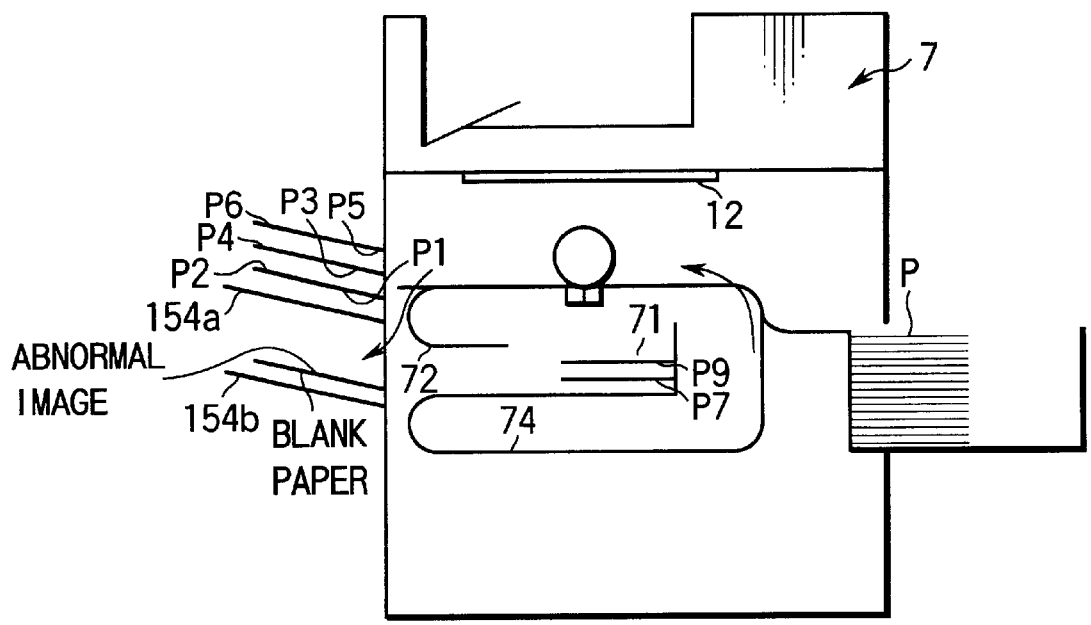

In this case, as shown in FIG. 13, the correctly printed paper P is sequentially discharged to the discharging tray 154a and only the paper P on which the abnormal image is printed is discharged to a discharging tray 154b.

With this construction, the correctly printed sheets of paper can be sequentially discharged. Further, it is possible to clearly separate the paper on which the abnormal image is printed among the discharged sheets of paper and permit the user to easily receive only the correctly printed paper.

Figure 14:
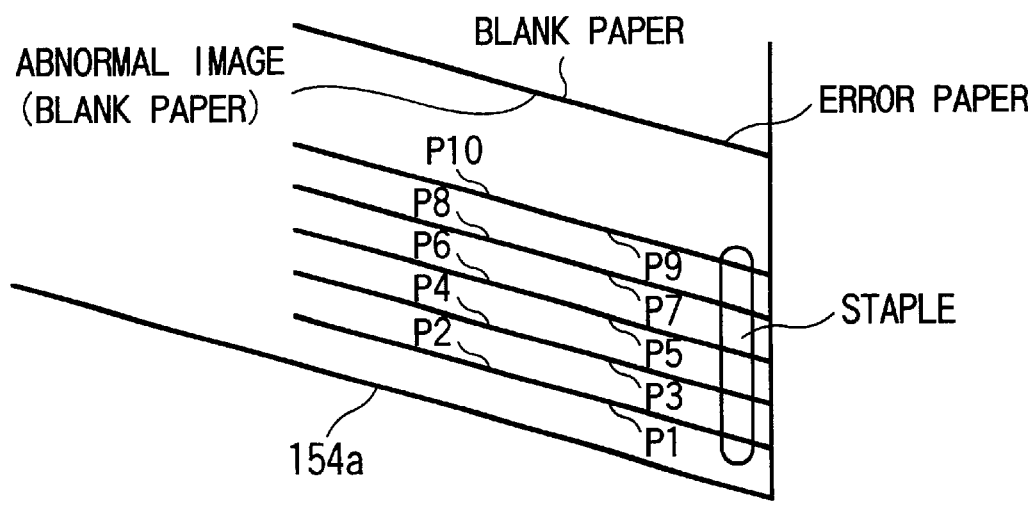
FIG. 14 is a view showing an example of discharging of copy paper by the staple process in the double printing operation.

Further, when the sheets of paper are stapled, the sheets of paper are stapled in the state shown in FIG. 12 before the paper P on which the abnormal image is printed and which is to be finally discharged is discharged as shown in FIG. 14 and then the paper P on which the abnormal image is printed may be discharged after the staple process is completed.

As a result, only the sheets of correctly printed paper can be stapled in a correct order without using another discharging tray.

Next, the printing process in the digital copying machine having the page memory 98 and double face printer 70 of FIFO system is explained with reference to the flowchart of FIG. 15.

When the printing process is started (step 1), the document D is started to be fed from the ADF 7, and at the same time, copy paper P is started to be fed from the paper feeding cassette in which sheets of copy paper P of a size specified by the user are received. Further, the main CPU 91 determines whether or not the copy paper P to be printed is stacked in the double face printer 70 (step 2). That is, at the time of feeding of the copy paper P on which the read image of the document is to be printed at the same time as feeding of the document D as shown in FIG. 5 or FIG. 7, whether or not the paper P is stacked in the double face printer 70 is determined.

If it is determined in the step 2 that the copy paper P is stacked in the double face printer 70, the main CPU 91 gives a stack number following the stack number indicated by the end pointer of the status table 93a to the copy paper P to be printed (step 3).

Then, the main CPU 91 reads the image of the document D fed from the ADF 7, and at the same time, prints the read image on the copy paper P fed from the paper feeding cassette (step 4).

During the printing process, as shown in FIG. 7, if abnormal feeding occurs at the time of feeding of the document by the ADF 7 or an abnormal reading operation, for example, the cut-off of the exposure lamp or erroneous driving operation of the carriage occurs, the copy paper P now set in the printing process is not left as it is on the feeding path, an abnormal image such as a blank image caused by abnormal reading, image which is interrupted on the way or an image in which an image of the preceding document is inserted is printed and the copy paper is stacked in the temporary storage section 71 in the double face printer 70.

If it is determined that the abnormal reading occurs (step 5), the main CPU 91 sets the error bit (error flag) of the status table 93a corresponding to the stack number attached to the copy paper P on which the abnormal image is printed in the step 3 to "1" indicating that the abnormal image is printed (step 6).

Further, as shown in FIG. 5, when no abnormal reading occurs and the read image of the document D is correctly printed (step 5) as the result of printing process, the error bit (error flag) of the status table 93a corresponding to the stack number attached to the copy paper P is set to "0" indicating that the image is correctly printed (step 7).

In the above step 2, if it is determined that the copy paper P is not to be stacked in the double face printer 70, the main CPU 91 determines whether the copy paper is fed from the double face printer 70 or not (step 8). That is, as shown in FIG. 9 or 11, when a read image of the even page of the document D stored in the page memory 98 is printed on the rear surface of the copy paper P on the front surface of which the odd page of the document D is printed and which is stored in the temporary storage section 71, whether the copy paper P is fed from the double face printer 70 or not is determined.

If, it is determined that the copy paper is fed from the double face printer 70 as the result of determination, the main CPU 91 acquires a stack number indicated by the top pointer of the status table 93a (step 9). Then, the main CPU 91 determines whether the image printed on the front surface of the copy paper is an abnormal image or not according to the error bit of "1" or "0" of the acquired stack number (step 10).

If it is determined that the image printed on the front surface of the copy paper is an abnormal image as the result of determination, the copy paper P is discharged with the rear surface non-printed or kept in the blank state (step 11).

At this time, in order to clearly separate the error paper and the correctly printed paper from each other, as shown in FIG. 13, it is possible to discharge the error paper to the discharging tray 154b which is different from the discharging tray for the correctly printed paper.

Further, if it is determined that the image printed on the front surface of the copy paper is not an abnormal image, as shown in FIG. 11, an image for the rear surface of the copying paper is read out from the page memory 98 and printed on the copy paper (step 12) and the copying paper is discharged to the discharging tray 154a.

Further, if it is determined in the step 8 that the paper is not fed from the double face printer 70, the main CPU 91 determines that it is not the double face printing process and the printing process for the single face of the copying paper P is effected (step 13).

As described above, the main CPU 91 performs the double face printing process as shown in FIGS. 5 to 13 by effecting the process of the steps 1 to 13 each time the printing process is effected.

Figure 16:
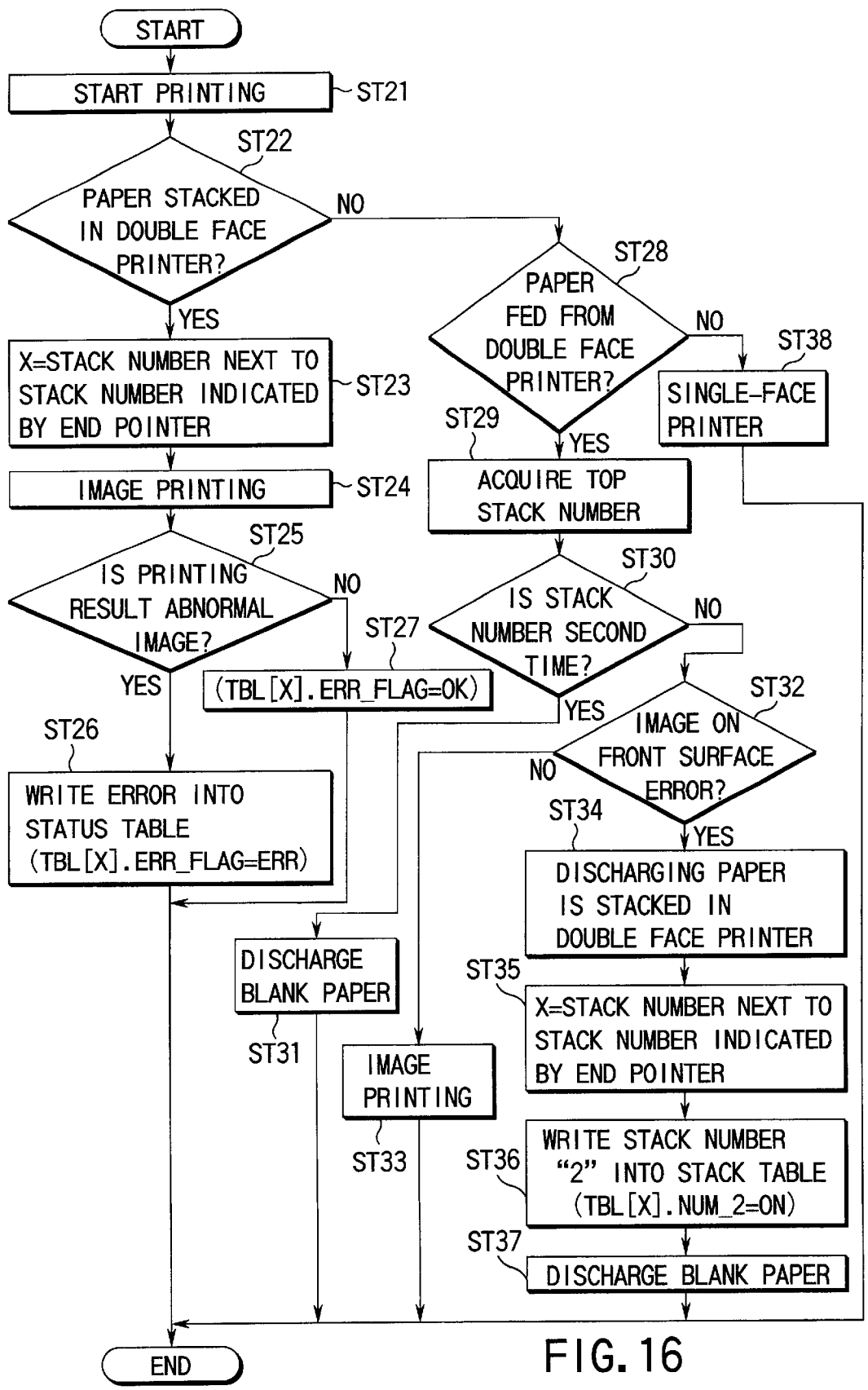
FIG. 16 is a flowchart for illustrating the printing process when error paper is discharged in the end.

Next, a process for discharging the paper P on which an abnormal image is printed after the correctly printed paper P is discharged is explained with reference to the flowchart shown in FIG. 16.

Like the steps 1 to 7, the main CPU 91 prints read images of the documents D of odd pages on the front surfaces of the sheets of paper P, stores them in the temporarily storage section 71, and stores an error bit for the paper stacked in the status table 93a (steps 21 to 27).

When it is determined that the paper P is fed from the double face printer 70 (step 28), the main CPU 91 acquires a stack number indicated by the top pointer (step 29) and determines whether the stack number is the second time or not according to whether the second-time stack bit of the acquired stack number is "1" or not (step 30).

If it is determined that the stack number is the second time, no image is printed on the paper P and the paper P is discharged to the discharging port 61 with the paper kept in the blank state (step 31).

If it is determined that the stack number is not the second time, the main CPU 91 determines whether or not the image printed on the front surface of the paper is an abnormal image according to whether the error bit is "1" or not (step 32).

If it is determined that the image printed on the front surface of the paper is not an abnormal image, a read image of the document D to be printed is read out from the page memory 98 and the read image is printed on the rear surface of the paper P (step 33).

Further, if it is determined that the image printed on the front surface of the paper is an abnormal image, no image is printed on the paper P and the paper P is stacked in the double face printer 70 with the paper kept in the blank state (step 34).

At this time, the main CPU 91 attaches a stack number next to the last stack number indicated by the end pointer to the paper P and sets the end pointer to the attached stack number (step 35).

Further, the main CPU 91 sets the second-time stack bit indicating that the number of the stacking time of the newly formed stack number is the second time to "1" (step 36).

Then, the main CPU 91 stores the paper P into the temporary storage section 71 with the paper P kept in the blank state (step 37).

By the process of the steps 21 to 37, the paper having an abnormal image printed on the front surface thereof and stacked is stored into the temporary storage section 71 again as shown in FIG. 10 and then finally discharged from the temporary storage section 71. Thus, the correctly printed paper P and the paper P having the abnormal image printed thereon can be clearly separated from each other even in a case where only one discharging tray is used.

Further, the staple process is effected when all of the correctly printed sheets of paper are discharged and the paper on which the abnormal image is printed is discharged at the time of completion of the staple process.

As a result, it is possible to prevent the sheets of paper in which the paper having the abnormal image printed is inserted from being stapled at the time of stapling.

As described above, at the time of double face printing, a stack number is attached to the paper to be stacked in the double face printer, data indicating the sheets of paper of stack numbers now stacked in the double face printer is stored into the status table, and the status is checked based on the top stack number when the paper feeding from the double face printer is started. At this time, when paper of a stack number corresponding to the error bit "1" is fed, the process for discharging the paper in the blank state is effected so as to prevent occurrence of a trouble caused by correctly printing an image on the rear surface of the paper on the front surface of which the abnormal image has been printed.

Further, when paper of a stack number corresponding to the error bit "1" is fed, the paper is received in the blank state into the double face printer of FIFO system again. At this time, a stack number is newly attached to the paper and a second-time stack bit indicating the second stack is set in the status table 93a.

Thus, after the correctly printed sheets of paper are all previously discharged, the paper corresponding to the second-time stack bit of "1" can be discharged and clearly distinguished from the correctly printed paper and the staple process can be effected in a state free from an error.

Next, the printing process in the double face printer 70 of FIFO system which has no memory or in which the memory is not used is explained.

In the copying machine using no page memory, while the documents of plural pages are being sequentially read, the second page of the document is printed on the rear surface of the paper of first page, the fourth page is printed on the rear surface of the paper of third page and so on and thus the printing process is effected.

For example, in a case where 10 single-face documents placed on the ADF 7 are printed by double face printing, if a jam of the document D occurs on the ADF 7, for example, and the document of third page fails to be correctly read, an abnormal image such as a blank image is printed on the paper P which is already fed at this time and then the paper is stored in the temporary storage section 71.

After this, if the user releases the paper jam of the document D, places the documents of the third and succeeding pages on the ADF 7 and specifies re-starting of the copying process, the paper P on which the abnormal image is printed and which is stacked in the temporary storage section 71 is taken out and discharged without printing any image thereon. Then, paper is newly fed from the paper feeding cassette to re-start the copying process for the third and succeeding pages.

Thus, it is possible to prevent the printing process from being re-started from the rear surface of the paper on the front surface of which the abnormal image has been printed and prevent the order of the pages of the printing result from being shifted when the abnormal reading of the document occurs.

Further, when the paper P on which the abnormal image is printed is discharged, it is possible to discharge the paper P on which the abnormal image is printed to the discharging tray 154b which is different from the discharging tray 154a to which the correctly printed paper P is discharged.

Thus, the paper on which the abnormal image is printed can be prevented from being inserted in the correctly printed and discharged paper and the correctly printed paper and the paper on which the abnormal image is printed can be clearly distinguished from each other.

Figure 17:
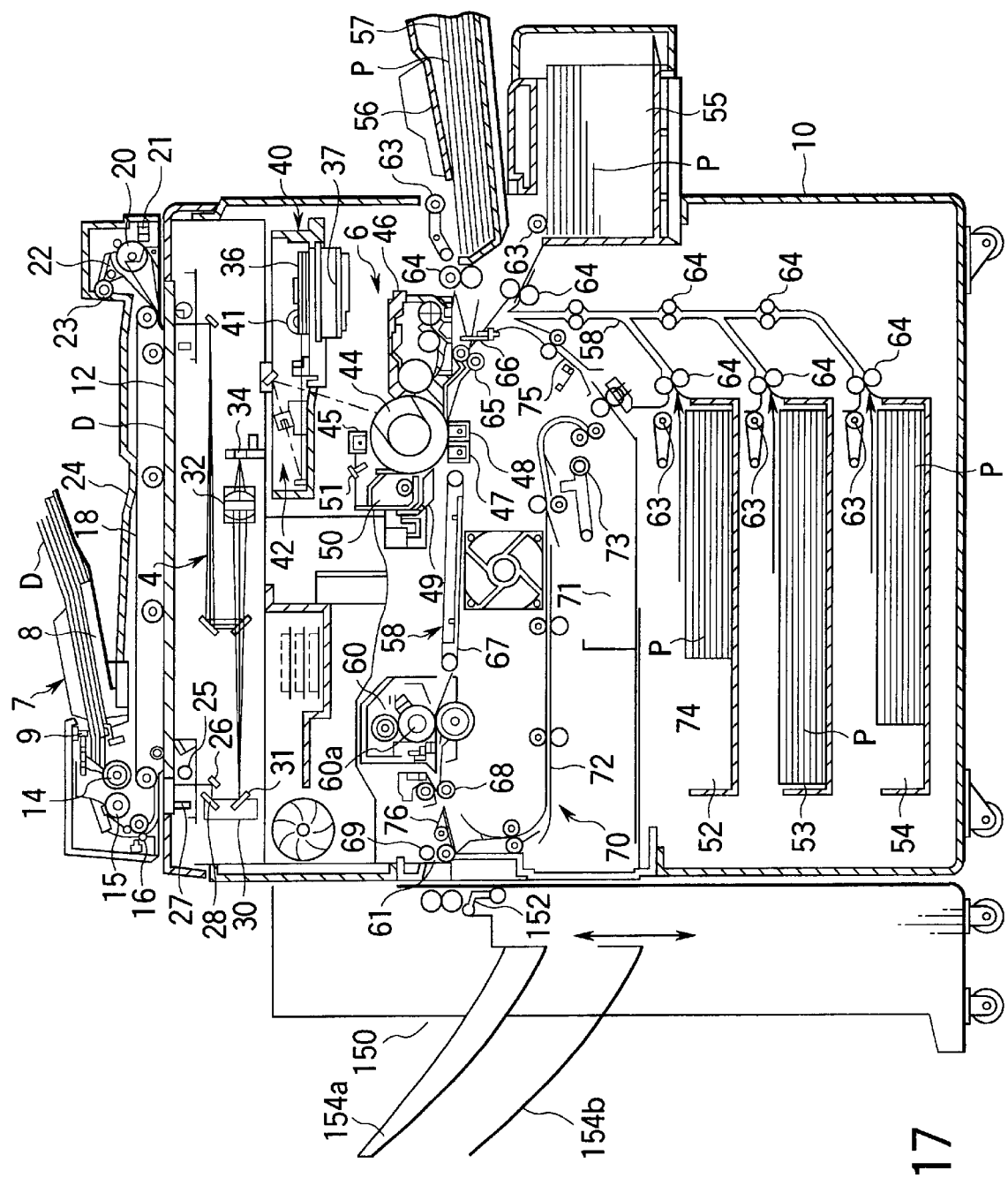
FIG. 17 is a cross sectional view showing the schematic construction of a digital copying machine having a double face printer of FILO system.

Next, a case wherein the double face printer 70 of the digital copying machine shown in FIGS. 1 and 2 is applied to a double face printer of first-in last-out (FILO) system shown in FIG. 17 is explained.

As shown in FIG. 17, the double face printer of FILO system reverses the front and rear surfaces of paper P fed from the distributing gate 76 in the double face printer 70 by use of the reversing path 72 and stores the paper in the temporary storage section 71. Then, when the copy paper P stored in the temporary storage section 71 is fed to the transfer section again, the copy paper P is taken out starting from the top of the sheets of paper stored in the temporary storage section 71 by use of the pickup roller 73.

For example, when 10 single-face documents are read by the ADF 7 and printed on the sheets of copy paper P by double face printing, the front and rear surfaces of sheets of paper on the one-side surfaces of which images are printed in the order of the second, fourth, sixth, eighth and tenth pages are reversed by the reversing path 72 and the sheets of paper are stored in the temporary storage section 71.

Then, the sheets of paper P stored in the temporary storage section 71 are sequentially taken out and read images of the documents D of odd pages are printed on the front surfaces of the sheets of paper of the ninth, seventh, fifth, third and first pages in the order of decreasing pages.

Further, when the copy paper P is stacked in the temporary storage section 71 of the double face printer 70, stack numbers are attached to the sheets of paper to be stacked in a stacking order and the state is stored in the status table 93a by use of an error bit indicating that the image is correctly printed or the abnormal image is printed.

Then, when the copy paper P is taken out from the temporary storage section 71, the state is checked starting from the last stack number indicated by the end pointer since the copy paper is sequentially taken out from the copy paper P finally stored in the FILO system.

For example, 10 single-face documents are placed on the ADF 7 and the double face printing is specified in the double face printer 70 of FILO system. Then, the images of the documents on the ADF 7 are sequentially read and the copy paper P is fed at the same time as feeding of the document D of even page.

Figure 18:
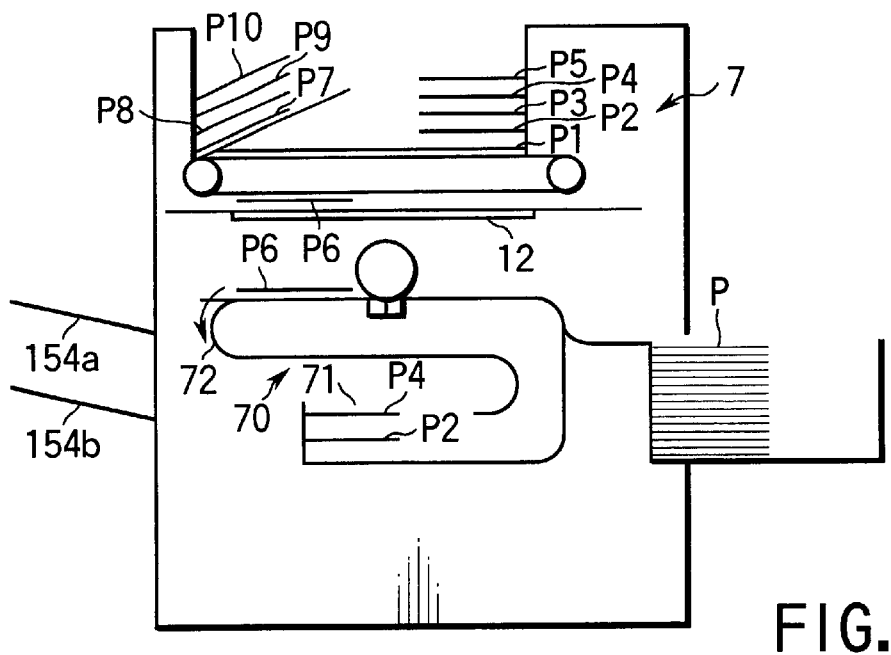
FIGS. 18 to 23 are views for illustrating one example of the double face printing operation by the double face printer of FILO system.

In this case, as shown in FIG. 18, the documents D on the ADF 7 are sequentially fed and the sheets of copy paper P are fed at the same time as feeding of the documents D of even pages of the second, fourth, sixth and tenth pages so as to print the images of the respective documents on the front surfaces of the sheets of copy paper P and store the copy paper in the temporary storage section 71 and store read images of the documents D of odd pages into the page memory 98. At this time, stack numbers are attached to the sheets of copy paper P stored in the temporary storage section 71 and a state indicating whether the read image of the document is correctly printed or not is stored.

Then, after the documents D become no more present on the. ADF 7 and the sheets of copy paper P on which the read images of documents D of even pages are printed are stacked in the temporary storage section 71, the sheets of copy paper P are sequentially taken out from the temporary storage section 71, the state indicated by the stack number attached to the-copy paper P taken out from the temporary storage section 71 is recognized by use of the status table 93a and the read images of the documents D of odd pages stored in the page memory 98 are read out printed in the order from the largest page.

Figure 19:
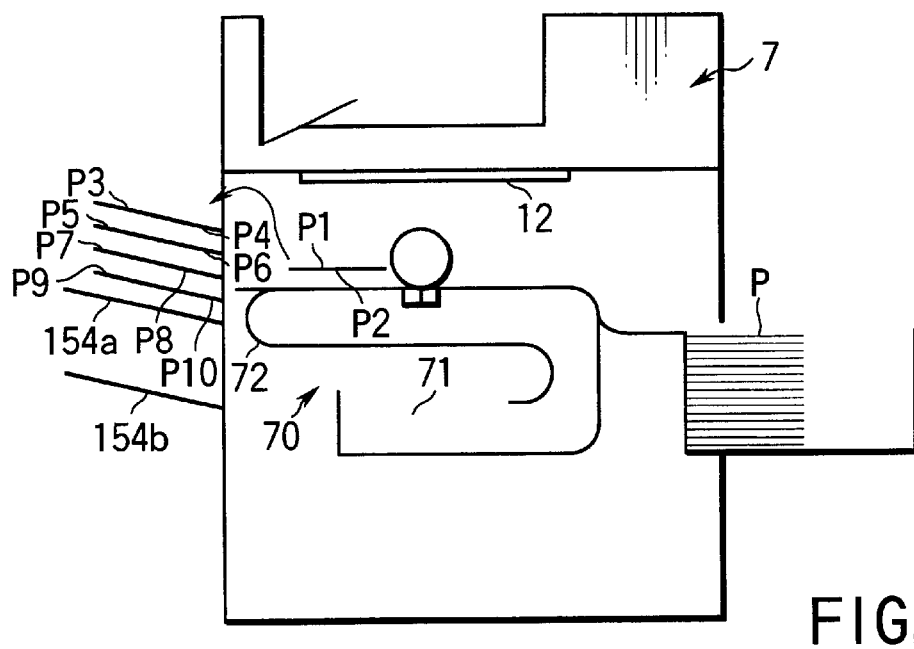

As a result, as shown in FIG. 19, the 10 single-face documents D are printed on both surfaces of the 5 sheets of copy paper P.

Figure 20:
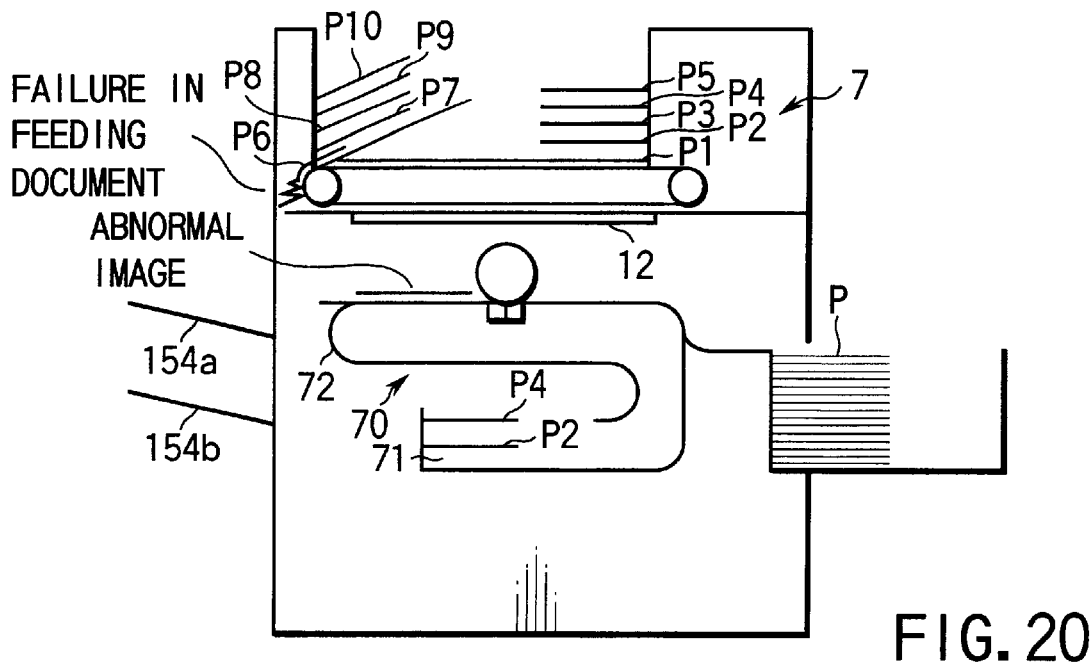

Further, as shown in FIG. 20, if the document D of sixth page fails to be fed, the copy paper P already fed is stored in the temporary storage section 71 with an abnormal image such as a blank image printed thereon, a stack number is attached to the copy paper P and an error bit of the stack number is set to "1" and stored in the status table 93a.

After this, if the user takes out the document D which fails to be fed, places the documents D of the sixth and succeeding pages on the ADF 7 and specifies re-starting of the copying operation, then the documents D on the ADF 7 are sequentially fed, read images of the documents D of even pages are printed on the front surfaces of the sheets of copy paper P fed and the sheets of copy paper P are sequentially stacked in the temporary storage section 71 as shown in FIG. 18.

Figure 21:
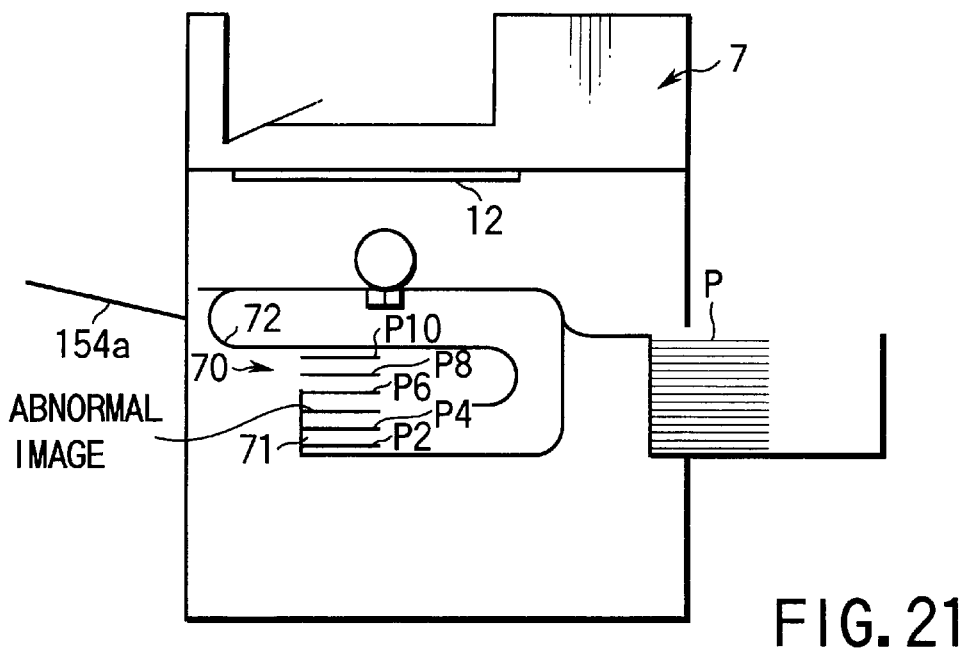

Then, as shown in FIG. 21, if the operation for stacking the copy paper P on which the read image of the document D of the last even page is completed, the sheets of copy paper P stored in the temporary storage section 71 are taken out in the order in which the copy paper is stored later, that is, in the order of tenth page, eighth page, . . . , and supplied to the transfer section and the read images of the documents D of odd pages stored in the page memory 98 are sequentially read out in an order from the largest page and printed.

In this case, if the error bit of the stack number indicated by the end pointer of the status table 93a is "0", the copy paper P is discharged with the read image printed thereon and if the error bit is "1", the copy paper P is discharged without printing any image thereon.

As a result, it is possible to prevent the correctly read image from being printed on the rear surface of the copy paper P on the front surface of which the abnormal image has been printed and prevent the printed page order after the page from being shifted.

Figure 22:
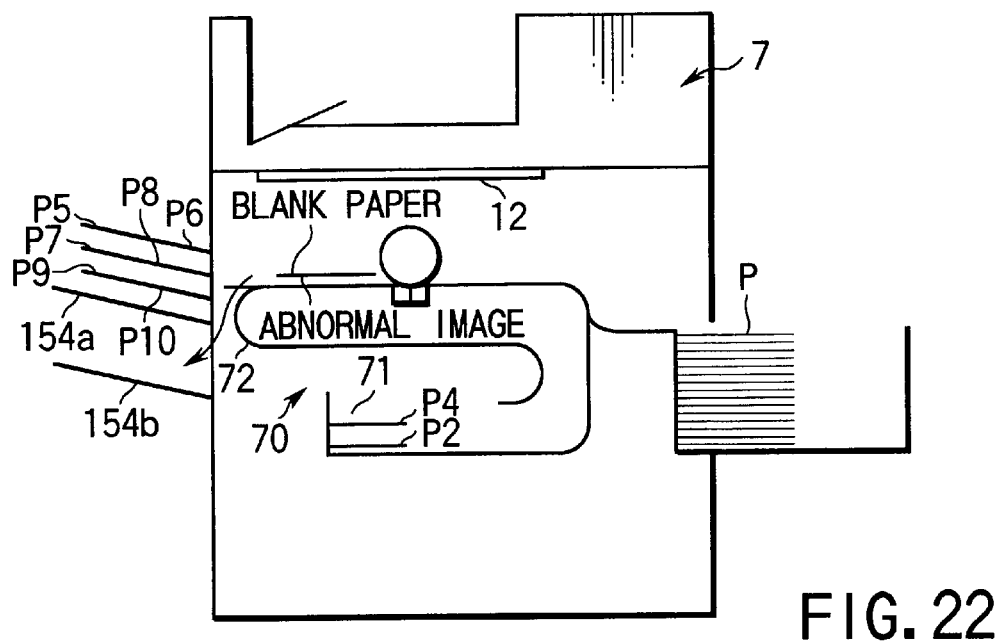

Further, as shown in FIG. 22, it is possible to discharge the correctly printed paper to the discharging tray 154a and discharge the paper on the front surface of which the abnormal image is printed without printing any image on the rear surface thereof to the discharging tray 154b.

Figure 23:
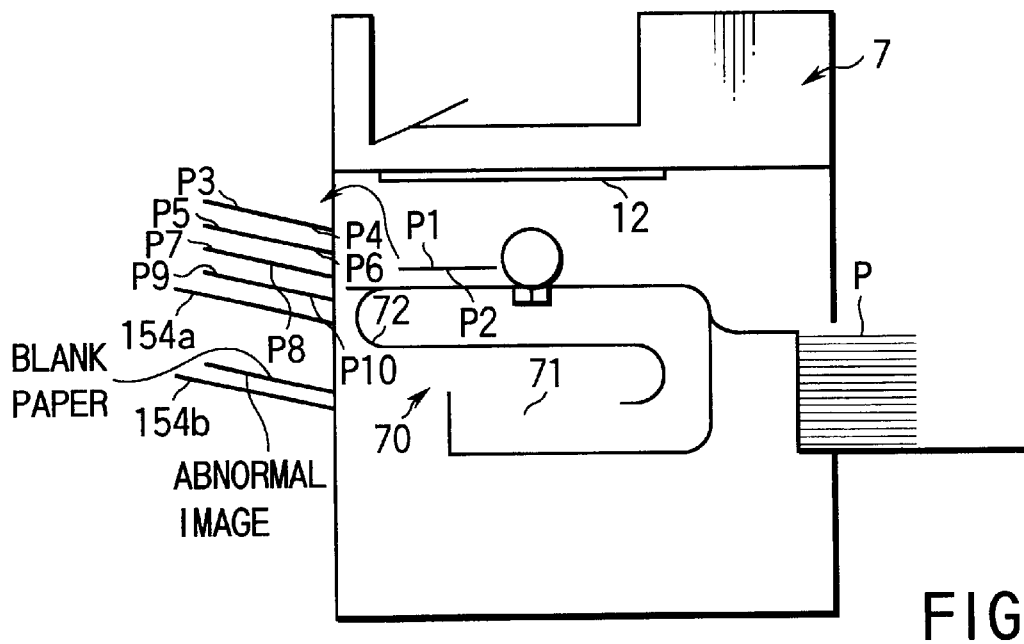
Figure 24:
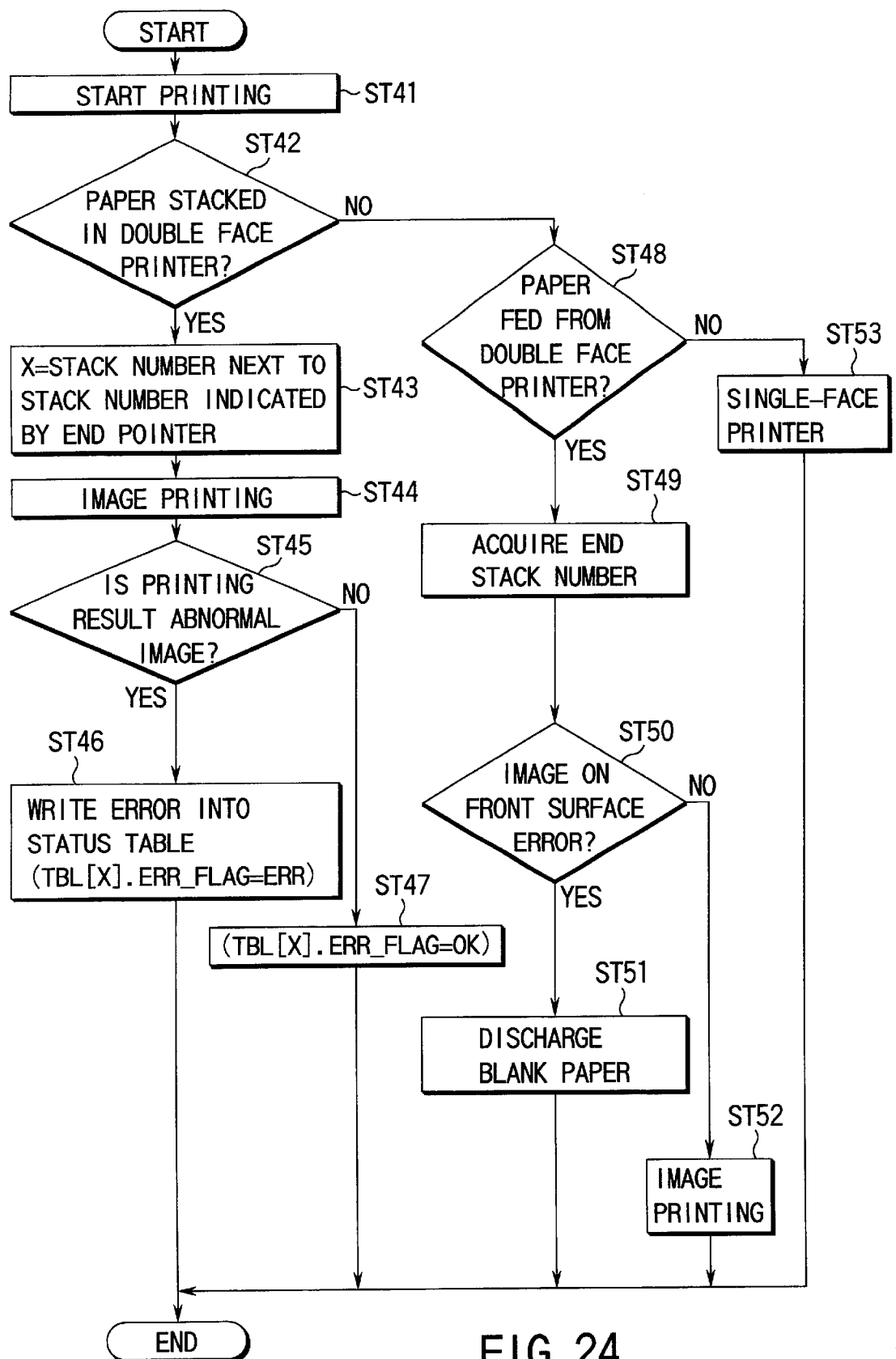
FIG. 24 is a flowchart for illustrating the printing process by use of the double face printer of FILO system.

In this case, as shown in FIG. 23, the correctly printed sheets of copy paper P can be sequentially discharged to the discharging tray 154a and the paper P on which an image is not correctly printed can be discharged to the discharging tray 154b.

As a result, the correctly printed copy paper P can be discharged in a correct order to the discharging tray 154a and the correctly printed copy paper P and the paper P on which an abnormal image is printed can be clearly distinguished from each other.

Next, the printing process in a case where the double face printer 70 of FILO system having the page memory 98 for storing read images is used is explained with reference to the flowchart shown in FIG. 23.

Figure 15:
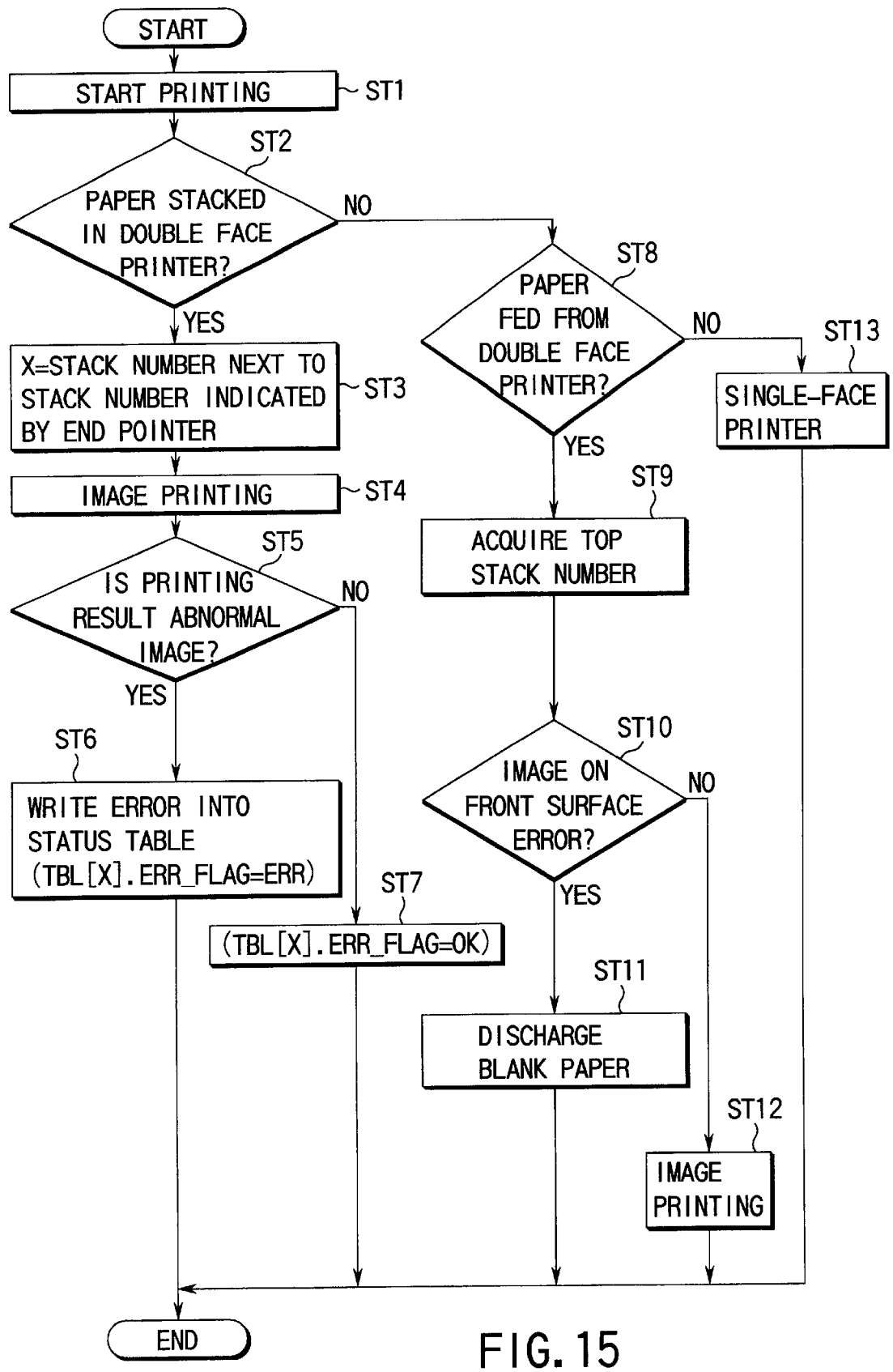
FIG. 15 is a flowchart for illustrating the printing process by use of the double face printer of FIFO system.

If the double face printer 70 of FILO system is used and when the read images of the documents D of even pages are printed, the main CPU 91 attaches a stack number to the copy paper P and stores a state of the paper P stacked in the temporary storage section 71 into the status table 93a like the steps 1 to 7 of FIG. 15 (steps 41 to 47).

Further, when the read images of the documents D of odd pages are printed, the main CPU 91 determines whether or not the paper is fed from the double face printer 70 (step 48). If it is determined that the paper is fed from the double face printer 70, the main CPU 91 recognizes the state of the stack number indicated by the end pointer of the status table 93a and determines whether or not the image on the front surface of the copy paper P taken out from the temporary storage section 71 is an abnormal image (error) (steps 49, 50).

If it is determined that the image printed on the front surface is an abnormal image, the main CPU 91 discharges the copy paper P to the discharging tray 154b which is different from that for the correctly printed paper P without printing any image on the rear surface of the copy paper P (step 51).

Further, if it is determined that the image on the front surface is not an abnormal image, the main CPU 91 effects the printing process for reading out a read image from the page memory 98, printing the image on the rear surface of the copy paper P and discharging the copy paper to the discharging tray 154a (step 52).

The main CPU 91 effects the single-face printing process (step 53) if it is determined that the printing process is not to stack the paper to the double face printer 70 and the paper is not fed from the double face printer 70.

As described above, the main CPU 91 effects the process of the steps 41 to 53 to effect the double-face printing process as shown in FIGS. 18 to 23 each time the printing process is effected.

Thus, only the copy paper P on both surfaces of which images are correctly printed is discharged to the discharging tray 154a, the copy paper P on which an abnormal image is printed is discharged to the discharging tray 154b, and only the correctly printed sheets of copy paper P can be sequentially discharged and clearly distinguished from the paper on which an abnormal image is printed.

Further, the double-face printing process is explained in a case where the double face printer 70 of FILO system has no page memory for storing read images or the page memory is not used.

In the printing process without using the page memory, a plurality of documents on the ADF 7 are sequentially fed and the copy paper P is fed, and the printing process is effected while the image of each document D is being read such that the images of the first and second pages are printed on the front and rear surfaces of the first sheet of copy paper, the images of the third and fourth pages are printed on the front and rear surfaces of the second sheet of copy paper, and so on.

For example, if a paper jam occurs on the ADF 7 and the document D of third page fails to be read, an abnormal image such as a blank image is printed on the front surface of the copy paper fed at this time and the copy paper is stored in the temporary storage section 71 in this state.

After this, if the user removes the document D which is jammed, places the documents of third and succeeding pages on the ADF 7 and specifies re-starting of the copying process, the copy paper P which is stored in the temporary storage section 71 and on which the abnormal image has been printed is taken out and discharged without printing any image on the rear surface thereof. Then, the printing process for the documents D of third and succeeding pages placed on the ADF 7 is effected.

Thus, the printing result can be output without printing the correctly read image on the rear surface of the paper on the front surface of which the abnormal image has been printed and shifting the printed page order after the page.

Further, when the copy paper P which is stored in the temporary storage section 71 and on the front surface of which the abnormal image is printed is taken out and discharged without printing any image on the rear surface thereof, it is possible to discharge the copy paper P to the discharging tray 154b which is different from the discharging tray 154a to which the correctly printed copy paper is discharged.

Thus, the correctly printed paper P and the paper P on which the abnormal image is printed can be clearly distinguished from each other.

Further, after the copy paper P which is stored in the temporary storage section 71 and on the front surface of which the abnormal image is printed is taken out, the paper can be fed again to the temporary storage section 71 without printing any image on the rear surface thereof and the printing process for the third and succeeding pages can be effected while the copy paper P on the front surface of which the abnormal image is printed is kept stacked.

In this case, if the printing process is effected while the paper with the abnormal image printed thereon is kept stacked, the paper stacked later is first taken out and the paper on which the abnormal image is printed and which is previously stacked is kept stacked since the double face printer 70 is of a first-in last-out system. Therefore, after the image of the document correctly read is printed, the copy paper P on the front surface of which the abnormal image is printed and which is stacked in the temporary storage section 71 is discharged.

As a result, the correctly printed sheets of paper are discharged in order to the discharging tray 154a, the paper on which the abnormal image is printed can be finally discharged, and the correctly printed paper and the paper on which the abnormal image is printed can be easily distinguished from each other.

Further, if the discharged paper is stapled, the staple process can be effected when the correctly printed paper is discharged and the copy paper P on which the abnormal image is printed can be discharged after the staple process is effected. Thus, only the correctly printed paper can be stapled in the correct order without inserting the paper on which the abnormal image is printed.

As described above, in a case where the control operation for feeding the paper on the front surface of which an image is printed is effected without waiting for completion of the feeding of the document by use of the automatic document feeding device and the double face printer, whether or not the front surface of the stacked paper is correctly printed is stored in the status table when the paper is stacked in the double face printer, and the paper on which the image is not correctly printed is discharged without printing any image thereon based on the contents of the status table when the image is printed on the rear surface of the paper.

As a result, if the document fails to be fed and the paper which is already fed is stacked in the double face printer without printing the correct image thereon, the result of printing caused by printing the correct image on the rear surface of the paper on the front surface of which the image is not correctly printed and different in the relation between the pages of the front and rear surfaces from the normal printing case can be prevented, the printing result with the same relation between the front and rear surfaces as the normal printing case can be attained, and the paper on which the image is not correctly printed can be easily distinguished by discharging the paper on the front surface of which the image is not correctly printed without printing any image on the rear surface thereof.

Further, in the case of double face printer of FIFO system, the printing result with the correct relation between the front and rear surfaces can be output and the printing result in the correct discharging order without inserting the paper having the abnormal image printed thereon can be attained by stacking the paper on which the abnormal image is printed in the temporary storage section again when the paper of abnormal image is taken out and finally discharging the paper of abnormal image by utilizing the feature that the sheets of paper are discharged in the stacking order.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming method effected by use of an image forming apparatus including reading means for reading plural pages of documents in the unit of page, image forming means for forming images read in the unit of page by use of the reading means on first and second surfaces of an image forming medium, discharging means for discharging the image forming medium on which the images are formed by the image forming means, first supply means for supplying the image forming medium received in a paper feeding section to the image forming means, and second supply means for supplying the image forming medium on the first surface of which the image is formed by the image forming means to the image forming means with the first and second surfaces of the image forming medium reversed, comprising the steps of:

effecting a process for reading each of the documents of odd pages by use of the reading means, forming the image on the first surface of the image forming medium by use of the image forming means and supplying the image forming medium to the second supply means when document images of plural pages are formed on the first and second surfaces of the image forming media;

determining whether reading of an image of the document to be formed on the first surface of the image forming medium is abnormal or not when said processing step is effected;

reading the document of even page by use of the reading means if it is determined in said determining step that abnormal reading of the document does not occur, then supplying the image forming medium processed by said processing step to the image forming means by the second supply means, forming the image on the second surface of the image forming medium and discharging the image forming medium; and discharging the image forming medium by the discharging means without forming the image on the second surface of the image forming medium processed in said processing step if it is determined in said determining step that abnormal reading of the document occurs and re-starting said processing step starting from the document which is determined to be abnormally read.

2. The image forming method according to claim 1, in which the discharging means of the image forming apparatus selectively discharges the image forming medium to a first discharging section or a second discharging section which is different from the first discharging section and which further comprises the step of discharging the image forming medium on the second surface of which the image for even page has been formed to the first discharging section and discharging the image forming medium on the second surface of which the image has not been formed to the second discharging section which is different from the first discharging section.

3. The image forming method according to claim 1, in which the second supply means of the image forming apparatus temporarily stores the image forming medium on which the image for odd page is formed into a receiving section and then supplying the image forming media to the image forming means with the first and second surfaces of the image forming medium reversed in the order in which the image forming media are later received into the receiving section and which further comprises the steps of storing the image forming medium which is now processed into the receiving section without forming the image on the second surface thereof when abnormal reading of the document occurs and re-starting the process starting from the document which is determined to be abnormally read; and discharging the image forming medium received in the receiving section by use of the discharging means without forming the image on the second surface thereof after the process for forming all of the images of the plural pages of documents is completed.

4. An image forming method effected by use of an image forming apparatus including reading means for reading plural pages of documents in the unit of page, first storage means for storing images of the documents of at least even pages read by the reading means, image forming means for forming images read in the unit of page by use of the reading means on first and second surfaces of an image forming medium, discharging means for discharging the image forming medium on which the images are formed by the image forming means, first supply means for supplying the image forming medium received in a paper feeding section to the image forming means, and second supply means for supplying the image forming medium to the image forming means with the first and second surfaces thereof reversed in the order in which the image forming medium is earlier received into a receiving section after the image forming media on which the images are formed by the image forming means are received into the receiving section, comprising the steps of:

effecting a process for reading the plural pages of documents by use of the reading means, forming the images of odd pages on the first surfaces of the image forming media and storing the image forming media in the receiving section, and storing the images of even pages into the first storage means when images of the plural pages of documents are formed on the first and second surfaces of the image forming media;

determining whether reading of an image of the document to be formed on the first surface of the image forming medium is abnormal or not when said processing step is effected;

storing abnormal reading into second storage means based on the order in which the image forming media are received into the receiving section when it is determined in said determining step that abnormal reading of the document occurs;

receiving the image forming medium now processed into the receiving section when it is determined in said determining step that abnormal reading of the document occurs and then re-starting the process starting from the document which is determined to be abnormally read; and sequentially supplying the image forming media stored in the receiving section to the image forming means by the second supply means after the process for all of the documents of odd pages is completed by said process, sequentially forming the images of the documents of even pages of the reading order stored in the first storage means on the second surfaces of the image forming media for which abnormal reading is not stored in the second storage means by use of the image forming means and discharging the image forming media by use of the discharging means, and discharging the image forming media for which abnormal reading is stored in the second storage means by use of the discharging means without forming the images by the image forming means.

5. The image forming method according to claim 4, in which the discharging means of the image forming apparatus selectively discharges the image forming medium to a first discharging section or a second discharging section which is different from the first discharging section and which further comprises the steps of sequentially forming the images of the documents of even pages of the reading order stored in the first storage means on the second surfaces of the image forming media for which abnormal reading is not stored in the second storage means by use of the image forming means and discharging the image forming media to the first discharging section by use of the discharging means after the process for all of the documents of odd pages is completed; and discharging the image forming media for which abnormal reading is stored in the second storage means to the second discharging section by use of the discharging means without forming the images by the image forming means after the process for all of the documents of odd pages is completed.

6. The image forming method according to claim 4, further comprising the steps of storing the image forming media for which abnormal reading is stored in the second storage means into the receiving section again without forming the images on the second surfaces by the image forming means after the process for all of the documents of odd pages is completed; and discharging the image forming media stored into the receiving section without forming the images on the second surfaces thereof by the discharging means after the image forming process for all of the documents of plural pages is completed.

7. An image forming method effected by use of an image forming apparatus including reading means for reading plural pages of documents in the unit of page, first storage means for storing images of the documents of at least odd pages read by the reading means, image forming means for forming images read in the unit of page by use of the reading means on first and second surfaces of an image forming medium, discharging means for discharging the image forming medium on which the images are formed by the image forming means, first supply means for supplying the image forming medium received in a paper feeding section to the image forming means, and second supply means for supplying the image forming medium to the image forming means with the first and second surfaces thereof reversed in the order in which the image forming medium is later received into a receiving section after the image forming media on which the images are formed by the image forming means are received into the receiving section, comprising the steps of:

effecting a process for sequentially reading the plural pages of documents by use of the reading means, storing images of the odd pages of documents into the first storage section, and forming the images of the even pages of documents on the first surfaces of the image forming media and storing the image forming media in the receiving section when images of the plural pages of documents are formed on the first and second surfaces of the image forming media;

determining whether reading of an image of the even page of document to be formed on the first surface of the image forming medium is abnormal or not when said processing step is effected;

storing abnormal reading into second storage means based on the order in which the image forming media are received into the receiving section when it is determined in said determining step that abnormal reading of the document occurs;

receiving the image forming medium now processed into the receiving section when it is determined in said determining step that abnormal reading of the document occurs and then re-starting the process starting from the document which is determined to be abnormally read;

sequentially supplying the image forming media stored in the receiving section to the image forming means by the second supply means after the process for all of the documents of even pages is completed by said process;

sequentially forming the images of the documents of odd pages set in a reverse order of the reading order stored in the first storage means on the second surfaces of the image forming media for which abnormal reading is not stored in the second storage means by use of the image forming means and discharging the image forming media by use of the discharging means; and discharging the image forming media for which abnormal reading is stored in the second storage means by use of the discharging mean without forming the images on the second surfaces thereof by the image forming means.

8. The image forming method according to claim 7, in which the discharging means of the image forming apparatus selectively discharges the image forming medium to a first discharging section or a second discharging section which is different from the first discharging section and which further comprises the steps of sequentially forming the images of the documents of odd pages set in a reverse order of the reading order stored in the first storage means on the second surfaces of the image forming media for which abnormal reading is not stored in the second storage means by use of the image forming means and discharging the image forming media to the first discharging section by use of the discharging means after the process for all of the documents of even pages is completed; and discharging the image forming media for which abnormal reading is stored in the second storage means to the second discharging section by use of the discharging means without forming the images by the image forming means after the process for all of the documents of even pages is completed.

9. An image forming method effected by use of an image forming apparatus including reading means for reading plural pages of documents in the unit of page, storage means for storing images of the documents of at least alternate pages read by the reading means, image forming means for forming images read in the unit of page by use of the reading means on first and second surfaces of an image forming medium, first supply means for supplying the image forming medium received in a paper feeding section to the image forming means, and second supply means for receiving the image forming media on the first surfaces of which the images are formed by the image forming means into a receiving section and then supplying the image forming medium received in the receiving section to the image forming means with the first and second surfaces thereof reversed, comprising:

a first step of sequentially reading the plural pages of documents by use of the reading means, forming images of the documents of alternate pages on the first surfaces of the image forming media, and storing images of the documents of alternate pages which are different from the images of the documents of alternate pages formed on the first surfaces of the image forming media into the storage means in a reading order when images of the plural pages of documents are formed on the first and second surfaces of the image forming media;

a second step of sequentially supplying the image forming media received in the receiving section to the image forming means by the second supply means and forming images stored in the storage means on the second surfaces of the image forming media in an order in which the image forming media are supplied when a process in said first step is completed;

a step of receiving the image forming medium now processed into the receiving section when abnormal reading of the document occurs at the time of formation of the image on the first surface in said first step and re-starting the process of said first step starting from the document of a page for which abnormal reading has occurred; and a step of shifting the page of abnormal reading and succeeding pages by one page according to an order in which the image forming media are supplied without forming the image of the page stored in the storage means when the image forming medium which is stored in the receiving section and for which abnormal reading occurs at the time of image formation is supplied at the time of effecting the process of said second step after the process of said first step is re-started.

* * * * *